United States Patent
Pandey et al.

(10) Patent No.: US 12,231,385 B2
(45) Date of Patent: Feb. 18, 2025

(54) SYSTEMS AND METHODS FOR A SMART MESSAGE ALERT AND RECALL

(71) Applicant: Adeia Guides Inc., San Jose, CA (US)

(72) Inventors: Rajendra Pandey, Karnataka (IN); Charishma Chundi, Andhra Pradesh (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/847,857

(22) Filed: Jun. 23, 2022

(65) Prior Publication Data
US 2023/0421518 A1 Dec. 28, 2023

(51) Int. Cl.
*H04L 51/212* (2022.01)
*H04L 51/42* (2022.01)

(52) U.S. Cl.
CPC ............ *H04L 51/212* (2022.05); *H04L 51/42* (2022.05)

(58) Field of Classification Search
CPC .............................. H04L 51/21; G06Q 10/107
See application file for complete search history.

(56) References Cited

U.S. PATENT DOCUMENTS

| | | | |
|---|---|---|---|
| 2009/0164233 A1* | 6/2009 | Arnold | G06Q 10/107 705/342 |
| 2009/0228583 A1* | 9/2009 | Pocklington | G06Q 10/107 709/224 |
| 2014/0214973 A1* | 7/2014 | DeLuca | H04L 51/226 709/206 |
| 2017/0093787 A1* | 3/2017 | Harihara | H04L 51/56 |
| 2019/0197479 A1* | 6/2019 | Huang | H04W 4/14 |
| 2020/0304438 A1* | 9/2020 | Kozloski | H04L 51/08 |

* cited by examiner

*Primary Examiner* — Caroline H Jahnige
(74) *Attorney, Agent, or Firm* — HALEY GUILIANO LLP

(57) ABSTRACT

Systems and methods for determining whether an alert should be generated, a delay period should be configured, or both, for a message composed in a messaging application or received by it, are disclosed. The methods determine a relationship score between a sender electronic device and a recipient electronic device. One or more analysis factors, which are determined based on the relationship score, are used to analyze the content of the message to determine whether the content is appropriate based on the relationship score and the applied factors. If the content is not appropriate, then an alert warning the sender of the inappropriate content is generated. A transmission delay period that is dynamically changed based on the relationship score and factors is embedded into the message such that the message may not be delivered until the expiration of such delay period. Emergency-related content is transmitted without an alert or delay.

21 Claims, 20 Drawing Sheets

1500

| Name | Relation | Years Known | Communication Frequency | Relationship Rank |
|---|---|---|---|---|
| Adam | Friend | 10 | Daily | 1 |
| Betsy | Mom | All life | Daily | 2 |
| Charlie | Player on same basketball team | 2 | Weekly | 4 |
| Diya | Friend | 15 | Once a year | 5 |
| Eraaj | Vice president and worked together at previous company | 4 | Twice a week | 6 |
| Frank | Son (8 years old) | 8 | Daily | 6 |
| Gina | Boss | 1 | Once a week | 8 |
| Harry | Facebook friend/Never met | 4 | Once a year | 10 |

FIG. 15

| Name | Relation | Total Messages | Deletion requests | Average Time period |
|---|---|---|---|---|
| Ron | Friend | 50 | 8 | 30 Seconds |
| Jack | Co-worker | 50 | 3 | 45 Seconds |
| Claire | Friend | 50 | 1 | 15 Seconds |

FIG. 16

| From | To | Past deletion requests | Content of message | Delay configured |
|---|---|---|---|---|
| Zoe | Klay | 8 | That is not a workable idea. Come up with something different. | 60 Second |
| Marlon | Klay | 1 | That is not a workable idea. Come up with something different. | None/15 Seconds |

FIG. 17

| From | To | Past deletion requests | Content of message | Message time | Other factors | Delay configured |
|---|---|---|---|---|---|---|
| Green | Steve | 4 | I am not going to do your work for you. | 2:35PM | GPS: At the office | None/15 Seconds |
| | | | | 10:17AM | Microphone input received Green's angry voices GPS: At the office | 30 Seconds |
| | | | | 1:37AM | GPS: Late Tavern Bar | 60 Seconds |

FIG. 18

SYSTEMS AND METHODS FOR A SMART MESSAGE ALERT AND RECALL

FIELD OF INVENTION

Embodiments of the present disclosure relate to messaging applications used for communicating between electronic devices and specifically to configuring various types of alerts, delays, and message recalls based on a plurality of dynamic factors such as relationship between sender and recipient and content of the message to be transmitted.

BACKGROUND

Messaging apps, such as WhatsApp™, allow users to exchange messages between electronic devices. These messages are texts, videos, audio recordings, and pictures. App notifications, such as push notifications, inform the recipient of the message when the message is received. The push notification feature is used by many mobile devices and is a native functionality to many operating systems, such as iOS and Android, where a local notification service handles the display of a notification payload according to user settings and the content of the payload.

Some messaging apps allow users to delete a message after it has been sent. This message is deleted if the recipient (or all recipients, in a group chat) has not seen the message. As depicted in FIG. 1, some messaging apps, such as WhatsApp allow a sender to select an option to delete the message for everyone. If the sender selects the option, then a message that states "You deleted this message" may be displayed on the sender's device. A similar message may also be displayed on the recipient's electronic device notifying them that a message was deleted. Such a deletion option is typically available to the sender for a fixed period of time, after which the sender may not delete or recall that message.

Deleting the message normally also deletes the notification associated with such message. But in cases where the user has enabled "previews," the users can see the content of the message without even opening the app. So, in some cases, users might have already seen the content of the message or a portion of it (e.g., if they looked at the notification when the message arrived and before the sender deleted the message). Users can send messages by mistake, and some of these messages can reveal confidential information that's not intended for the recipient—or the message can be something personal, like a picture, or the message can contain words that are considered offensive and sent in the heat of the moment, etc.

A problem with current messaging approaches is that they use a standard delay time period for all messages. If the sender has not deleted the message within the allotted amount of time, which is the same amount of time for all messages, then the sender can no longer recall or delete the message.

Another problem with the current approach is that the delay is agnostic to the type of message or to the recipient. Since senders vary in their reaction times after having sent their messages, and senders may send various types of messages that differ in content from one another and send them to a variety of recipients, using a cookie-cutter approach creates several problems. For example, such an approach does not account for different types of senders that vary in their reaction times and may not react within the allotted delay time provided. Another problem is that the methods are more reactive, since they first deliver the message and subsequently provide the sender the opportunity to recall the message.

As such, there is a need for a method and system that is proactive and dynamic, determines a need for a delay, customizes the amount of delay based on the content of the message and the sender's relationship with the recipient, and is proactive in warning the sender prior to the sending of the message of the possible need to correct any inappropriate content.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which:

FIG. 15 is an example of a table that is used to describe using a delay pattern in determining a delay for a current message, in accordance with some embodiments of the disclosure;

FIG. 16 is an example of a table that is used to describe using a delay pattern in determining a delay for a current message, in accordance with some embodiments of the disclosure;

FIG. 17 is an example of a same message sent by two different senders that results in two different transmission delay periods, in accordance with some embodiments of the disclosure;

FIG. 18 is an example of using factors such as time, location, and mood in determining a delay for a current message, in accordance with some embodiments of the disclosure;

DETAILED DESCRIPTION

Figure 1:
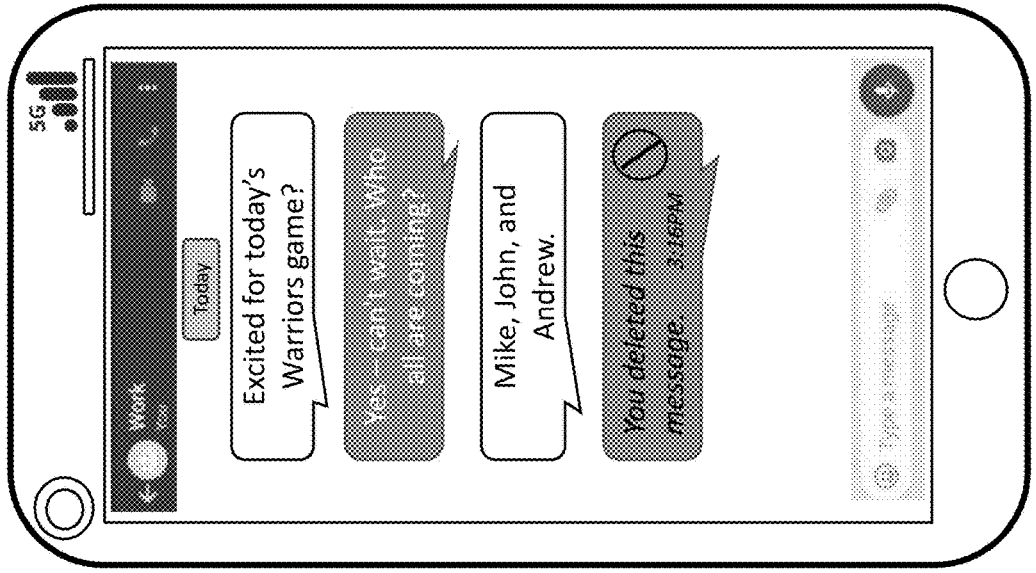
FIG. 1 is a prior art figure to illustrate the current state messaging.
Figure 1:
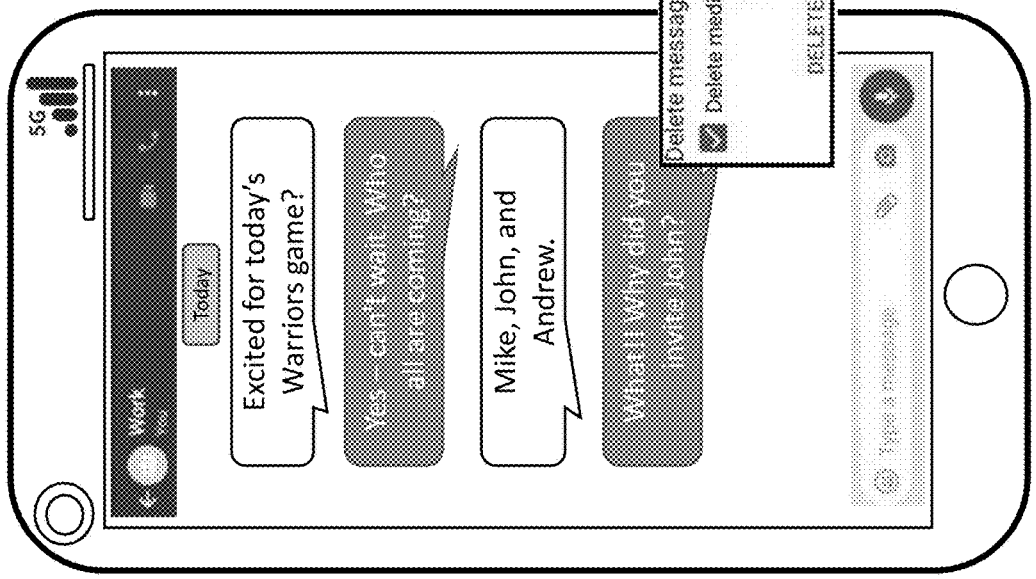

In accordance with some embodiments disclosed herein, some of the above-mentioned limitations are overcome by a) providing an alert, b) configuring a delay time period for transmitting and recalling the message, and c) both providing an alert and configuring a delay time period. The options a-c discussed above are determined based on the content of the message, the relationship between the sender and recipient, and application of one or more factors and their degree of application, which are determined based on the degree of relationship between the sender and recipient.

In some embodiments, the systems and methods described herein are used to receive an indication of a message being composed or receive a request to transmit a composed or forwarded message. The message may either be composed in a messaging application or received by the messaging application with a request to be forwarded to other recipients. In response to a message being composed or requested to be transmitted or forwarded, the methods determine the relationship between the user of the sender electronic device and the user of the receiving electronic device. For example, a determination is made whether the sender and recipient are relatives, friends, co-workers, etc.

Once a relationship is identified, the methods dig deeper into the relationship to determine the strength of the relationship. The strength is determined by scoring the relationship based on one or more relationship factors, such as years known, how frequently the sender and recipient communicate, when their last communication was, etc.

The relationship factors may distinguish same type of recipients from one another. For example, in one scenario, the sender may have two friends that are recipients of a message. The sender has known the first friend longer and communicates daily with the friend, as opposed to the second friend, with whom the sender communicates once a year. Accordingly, the methods and systems determine that the sender's strength of relationship with the first friend is stronger and determine a higher relationship score for the first friend than the second friend.

Upon determining the relationship score, one or more analysis factors may be selected and used to analyze the content of the message. The analysis factors include language, gender, abusive words, anger or other sentiments, nudity, ethnicity, time, location, etc. The analysis factors are scored in relation to earlier-determined relationship scores. For example, if language, as an analysis factor, is used to determine whether the language used in the message is appropriate, the language factor may be given a higher score when the relationship score is higher. In other words, a higher tolerance of language may be considered appropriate when the relationship between the sender and the recipient is strong.

The message may be analyzed for its language, and other analysis factors, based on the analysis score or threshold set for the analysis factor. If a determination is made that the message exceeds the threshold, then the system may either display an alert, delay the transmission of the message, or both.

In some embodiments, the alert may be displayed as a pop-up message that appears in the messaging app. Alert, as used herein, may also be a warning, error, message, or a system notification. The alert message may identify the reasons for the alert and provide suggestions to overcome the inappropriateness that triggered the alert. The alert may be provided during the composing of the message or when the message is fully composed. If the sender decides to ignore the alert and request the transmission of the message, then the message may be embedded with a delay period that delays the transmission to the sender until the expiration of the delay period.

In some embodiments, the methods and systems may delay the transmission of the message if the user overrides the alert. In other embodiments, regardless of whether an alert was displayed, the system may delay the transmission of the message based on relationship and analysis factors, including based on pattern of deletes and recalls performed by the sender for previous messages.

In some embodiments, the delay may be determined based on the sender's deletion history of previous messages, likelihood that the current message may be deleted, and other relationship and analysis factors.

The amount of delay may be determined based on a plurality of factors that are used in anticipating the likelihood of the message being recalled or deleted by the sender. For example, the server may determine a pattern based on previous deletions and determine whether the current message falls within the pattern. The amount of delay may also depend on the history of the sender's previous deletion/recall requests and the reaction time it took the sender to request the delete/recall. For example, the system may determine that the sender has deleted previous messages on an average of 30 seconds after the send request. As such, the system may determine that the current message, if warranting a delay based on the analysis, would also need at least a 30-second delay to provide enough reaction time to the sender.

The delay may also be determine based on the likelihood of the amount of time it may take for the sender to recall the message. As mentioned above, this may be determined based on prior recall history and the time it took to recall a message.

The delay may also be determined based on the user's prior interactions and analysis of those interactions performed by an ML and/or AI engine by executing an ML and/or an AI algorithm. The results obtained from the execution of the ML/AI algorithms may be used to determine a pattern of prior recalls and deletions and determine a likelihood that the current message will also be deleted or recalled.

Some of the factors considered in determining a delay may include time the message is sent, location of the sender, and sender's mood while sending the message. The system may use components of the sender's electronic device, such as the clock, GPS sensor, and microphone to determine the time the message is sent and location of the sender. For example, if the system determines that the message is being sent at 2:00 AM and the sender is at a bar, then it may determine a higher likelihood that the message would be recalled and as such embed a higher delay time for the transmission.

Delays and alerts may be prevented or overridden in certain circumstances. For example, in some embodiments, the system may determine that the messages are part of an ongoing conversation. When such a determination is made, the system may transmit the messages without producing an alert or embedding a delay. In another example, in some embodiments, the message may contain words or phrases that can be associated with a level of urgency or emergency. In such embodiments, the system may transmit the message to the recipient without any alerts or delays.

In some embodiments, the system may generate knowledge graphs that reflect the relationship, strength of relationship, and details relating to the recipient such as their age, gender, and preferences. Such data may be used in calculating relationship scores and ensuring that content appropriate for the sender is sent and inappropriate content is subject to an alert or a delay.

Figure 2:
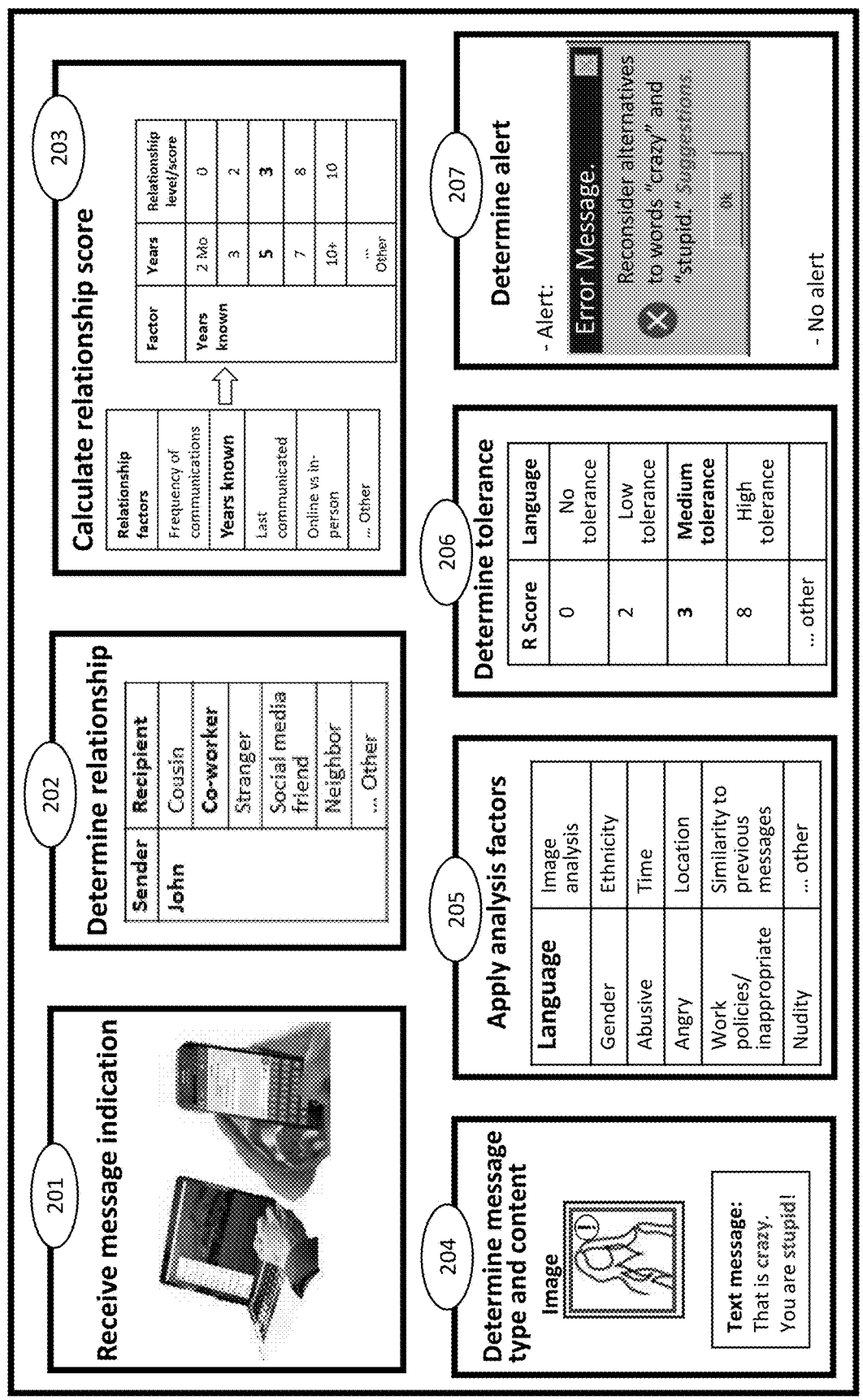
FIG. 2 is a block diagram of an example of a process for configuring display of an alert on a sending user's electronic device, in accordance with some embodiments of the disclosure.

FIG. 2 is a block diagram of an example of a process for configuring display of an alert on a sending user's electronic device, in accordance with some embodiments of the disclosure.

Figure 4:
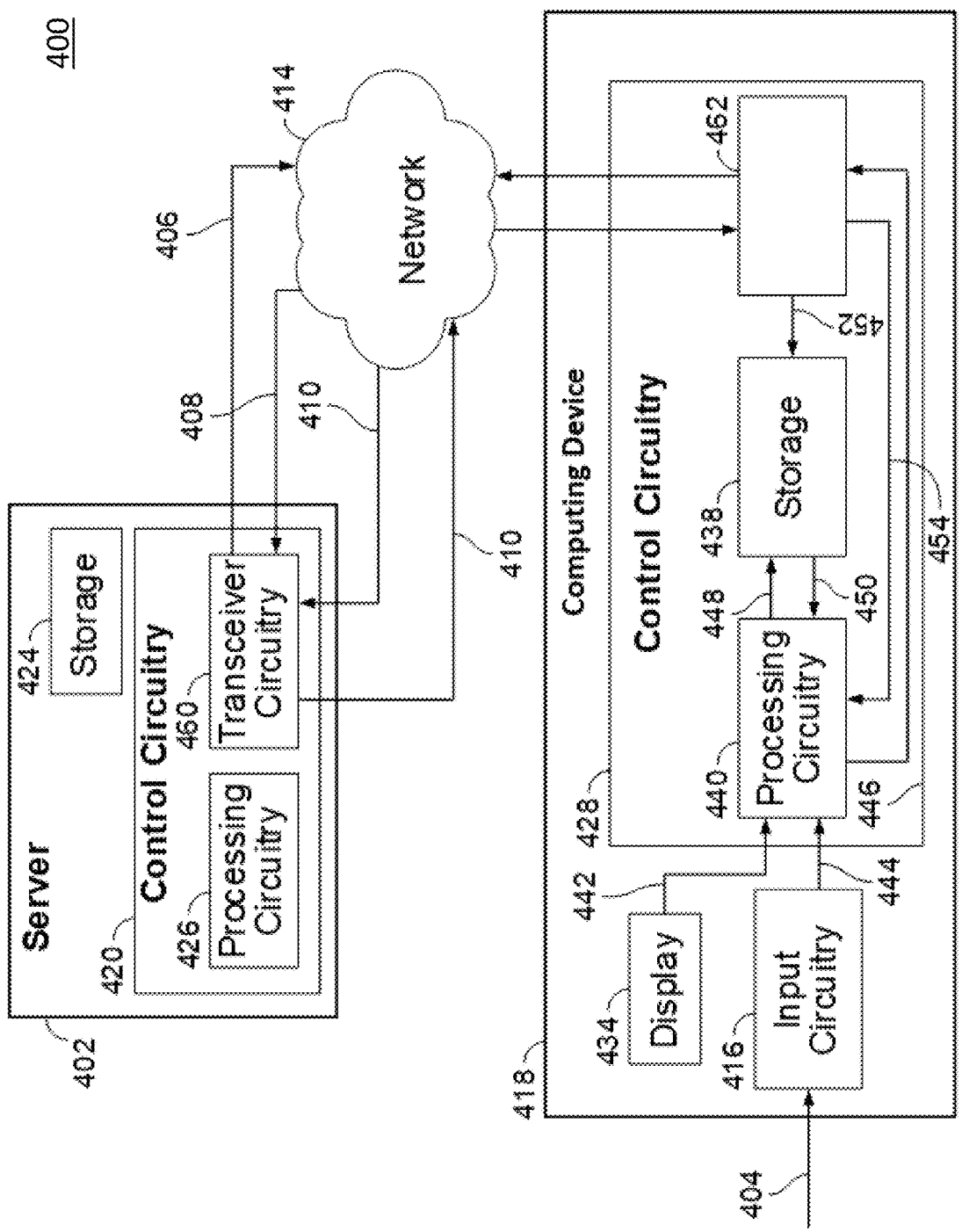
FIG. 4 is a block diagram of an exemplary system for configuring an alert and determining delay period of a message, in accordance with some embodiments of the disclosure.

In one embodiment, at block 201, an indication of a message is received by a server, such as the server 402 depicted in FIG. 4. The indication of a message is received in response to composing of a message in a messaging application. The message application may be downloaded or previously installed, such as factory-installed, on mobile phones, laptops, desktops, tablets, smart television and gaming devices, or other communication devices. Some examples of such messaging applications include WhatsApp, Google Hangouts™, WeChat™, Viber™, Facebook Messenger™, Instagram™, Microsoft Teams™, Zoom™, Yammer™, Slack™, PlayStation™, and Xbox™.

The indication of the message may be received by a server while the sender is still in the process of composing the message, or the indication may be received after the message is completed or a certain number of words are entered. When the message is an image, the indication may be received when the user has selected an image to be attached to their message.

At block 202, the relationship between the user of the sender electronic device and the user of the receiving electronic device, also referred to herein as recipient electronic device, is determined. As depicted, in one embodiment John may be a sender/user using a messaging app on the sender electronic device. John may have composed the message to a recipient who is in John's contacts database, such as phone contacts on his mobile phone, or email contacts on his laptop. John may have entered the recipient's email, phone number, or some other address of the recipient where the message is to be sent. The server may associate the address information with a mode of communication through which the message is to be sent.

In one embodiment, the relationship between John and the recipient may be determined based on John's profile. For example, John may have stored the recipient's contact information in his phone or his laptop along with a relationship associated with the recipient, such as cousin, co-worker, neighbor, etc. In other embodiments, the server may access one or more accounts associated with the sender, such as their social media accounts, work accounts, and email accounts, and determine the relationship between the sender and the recipient based on analysis of the data from these accounts. For example, John may have referred to the recipient as his co-worker in a post on a social media platform. He may have also messaged another recipient and referred to the current recipient as his coworker.

In other embodiments, the server may access voice inputs from electronic devices used by John and analyze them to determine the relationship between John and the recipient. For example, in a phone call between John and his friend, John may have referred to the current recipient as his coworker. The server may pick up such communications and determine that the current recipient to whom the message is being sent is John's coworker. The server may also monitor other inputs, such as through IoT devices, emails, and other communications, to determine the relationship between John and the current recipient.

As depicted in block 202, in this embodiment, the server has identified the current recipient to be John's coworker. At block 203, the relationship is further analyzed to determine the degree and strength of such relationship. Such analysis determines whether the relationship is a casual, weak, or strong, or some other degree and strength of relationship. Since simply being a co-worker may not be sufficient in determining the strength of the relationship, analyzing one or more relationship factors, and determining a relationship score for the analyzed factors, as depicted in block 203, may provide a more complete picture. For example, John's relationship with one co-worker may be different in strength from his relationship with another co-worker, and such analysis may provide a relationship score to distinguish between the relationship strengths of the two co-workers.

In some embodiments, a relationship score or a relationship level may be determined based on one or more relationship factors as depicted in block 203. For example, a relationship score with the coworker may be determined based on the number of years that John has known the co-worker. The higher the number of years known, the higher the relationship score may be between John and the coworker. As depicted at block 203, the relationship score determined in this example may be a "3" since John has known the co-worker for a period of five years. Other numbers, values, and scales and designations besides a number, such as high, medium, or low, may also be used.

In one embodiment, the server may rely on the relationship score calculated based on just one of the relationship factors. In other embodiments, the server may calculate a relationship score based on one or more relationship factors and determine and overall average relationship score. Other combinations of relationship factors and their scores may also be used in computing an overall relationship score. For example, averages, means, or other formulae may also be applied to compute an overall relationship score.

At block 204, the server determines the type of message composed in the messaging application of the sender electronic device. The type of message may be a text message, an image, an image with text, an audio file, or a video.

In one embodiment, the server may apply the same processes as described in the descriptions of FIGS. 2, 3, 7, 8 and 10 to all types of messages or may apply any one of the processes described herein. For example, in some embodiments, a message that is an image may be treated differently from a message that is textual. For example, the message that is an image may be compared with other images in a database to determine whether it is appropriate, based on the relationship between the users of the sender and receiving devices, to transmit the message or display an alert. A message that is textual may be analyzed for its words and context.

Figure 14:
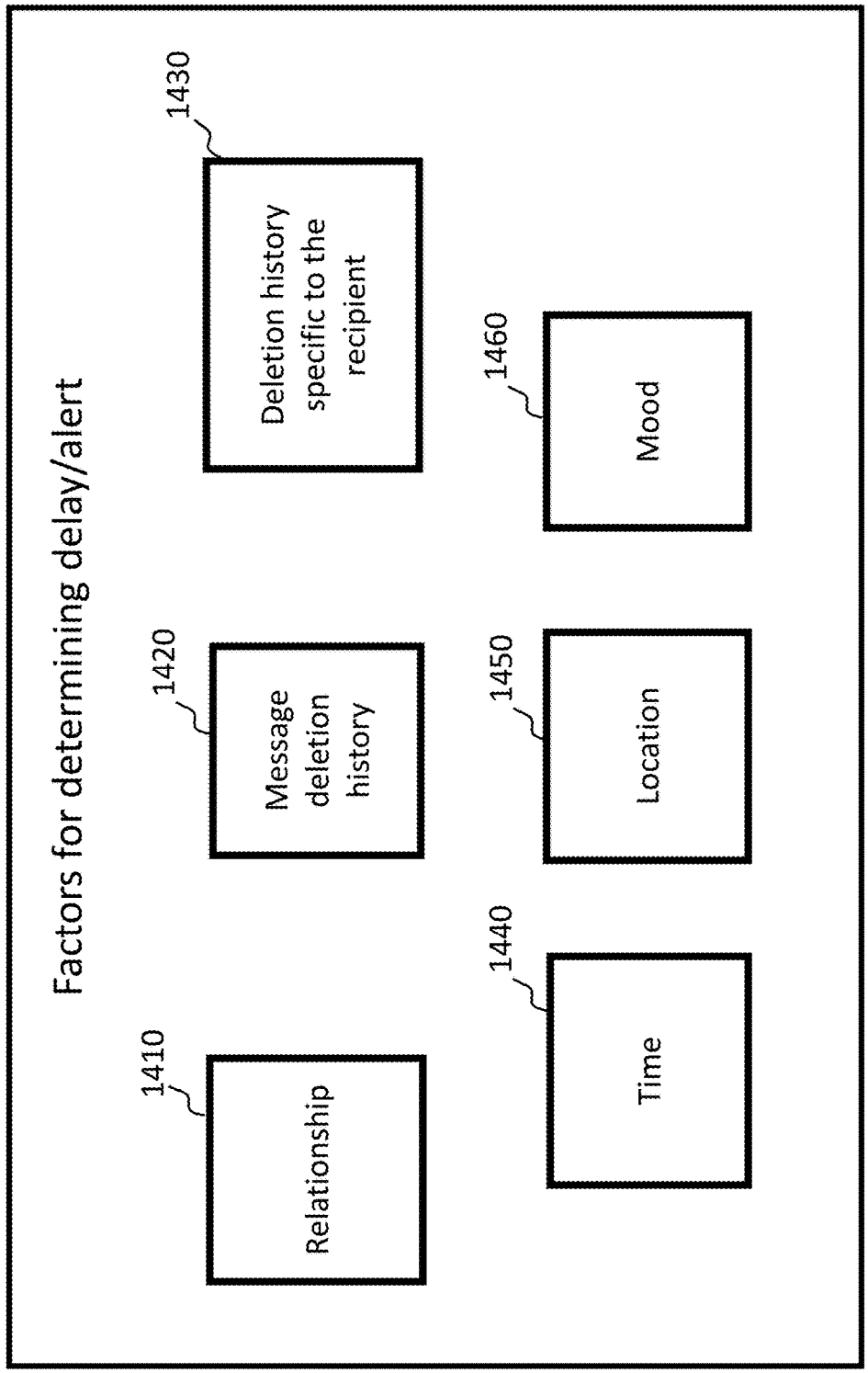
FIG. 14 is a block diagram of an example of factors used in analyzing/providing an alert or delaying transmission of a message, in accordance with some embodiments of the disclosure.

At block 205, one or more analysis factors from a plurality of analysis factors may be applied to determine a next course of action for the composed message. In some embodiments, the factors include language, gender, abusive words, anger or another emotion, work-related policies and things that may be considered inappropriate for work, nudity, image analysis, ethnicity, time, location, similarity to previous messages, and other factors as depicted in FIG. 14.

In some embodiments, each analysis factor may be given a score based on the earlier determined relationship score. For example, as depicted in block 206, an analysis factor, i.e., language, may be given a score based on the relationship score/level determined at block 203. As depicted, in one embodiment, since the relationship score was determined to be a "3" in block 203, the analysis factor, language, will be given a score that corresponds to the relationship score of "3," which is "medium tolerance." Although a scale that has "no tolerance" to "high tolerance" is used, the embodiments are not so limited, and other numbers, values, and scales and designations besides the scale depicted may also be used. For example, a scale of 1-10, 1-100, or A-Z may also be used.

In this embodiment, a medium tolerance score was configured for the analysis factor "language." If the relationship score in block 203 was higher, such as an "8," then, accordingly, the score configured for the analysis factor "language" would be "high tolerance." As described above, the relationship score determined at block 203 may be dependent upon one or more relationship factors, and an average, mean, or some other method may be used to determine the overall relationship score. For sake of explanation, only one relationship factor, i.e., "years known," is being used to determine a score for the analysis factor "language."

In some embodiments, the score or degree of the analysis factor is used in analyzing the content of the composed message to determine whether the message is appropriate for sending to the designated recipient, which in this case may be a co-worker, as depicted in block 202. In other words, using one relationship factor and one analysis factor for sake of description, the longer John has known his co-worker, which is measured by the number of years known, the higher the tolerance would be for the language used by John in composing the message to his co-worker. Since John has known the co-worker for five years, the server may allow a medium level of tolerance in type of language used by John to the co-worker.

In some embodiments, the process of blocks 202-206 is followed to determine a relationship score, factor score associated with the relationship score, and compare the content of the message to determine if the content, or a score calculated for the content, exceeds the factor score. In other embodiments, the process of 202-206 is modified to determine the relationship strength as depicted in blocks 202-203 and if the relationship score is user to determine appropriateness of the content thereby not evaluating the content on a factor-by-factor basis as depicted in blocks 205-206.

At block 207, a determination is made whether the message is within the medium level of tolerance or if it exceeds the medium level of tolerance, i.e., exceeds the threshold level determined for the analysis factor. If a determination is made that the message exceeds the allowable tolerance, which is medium tolerance, then, as depicted at block 207, the system displays an alert on the sender electronic device.

In some embodiments, the alert may be a pop-up message that appears in the messaging app. In other embodiments the alert or error message may be provided as a text message. Other formats of alerts are also contemplated.

In some embodiments, the alert message may identify the reasons for the alert and provide suggestions. The suggestions may provide other words, phrases, sentence structures or thoughts and ideas, which may be obtained from an artificial intelligence (AI) engine running an AI algorithm to determine what is acceptable and not inappropriate language. Some examples of the alert and suggestions are provided in FIGS. 19A and 19B.

In other embodiments, the content of the message, such as the words and phrases, may be compared to a database of words and phrases to determine if the words and phrases composed in the message are inappropriate. In this embodiment, the database may contain a list of words that are identified as appropriate or inappropriate for different types of relationship scores.

In other embodiments, the alert may simply be an error message without any suggestions notifying the sender that the content of the message is inappropriate.

If a determination is made at block 206 that the message does not exceed the allowable tolerance, which is medium tolerance, then, the system may transmit the message without displaying an alert.

In some embodiments, the message may contain words or phrases that can be associated with a level of urgency or emergency. In such embodiments, the system may transmit the message to the recipient without displaying any alerts on the sender electronic device. The system may also bypass determining relationship scores or applying analysis factors as depicted in blocks 203, 205-206 and transmit the message to the recipient's electronic device as quickly as possible and without displaying any alerts.

Figure 3:
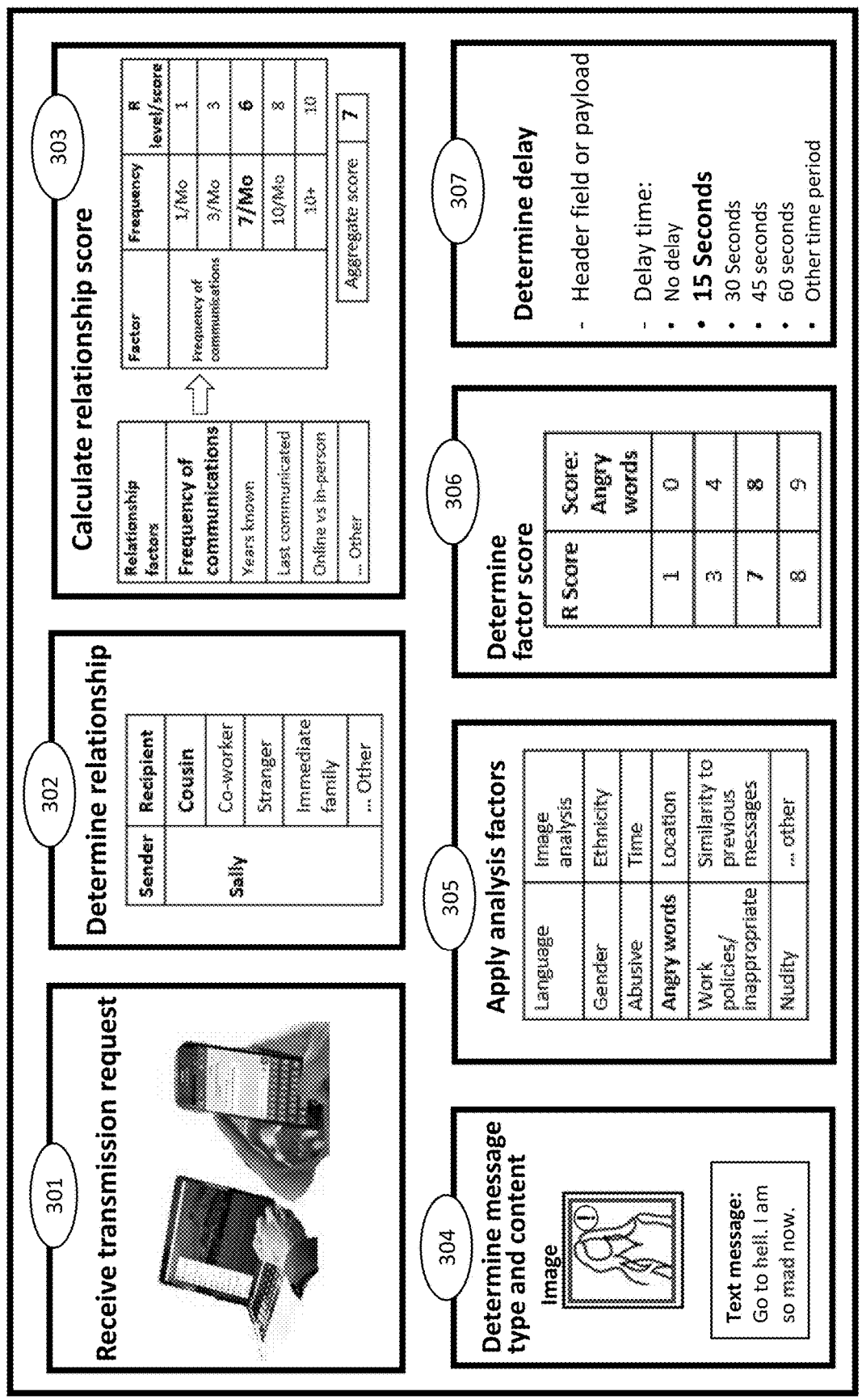
FIG. 3 is a block diagram of an example of a process for determining delay period of a message, in accordance with some embodiments of the disclosure.

FIG. 3 is a block diagram of an example of a process for determining delay period of a message, in accordance with some embodiments of the disclosure.

In one embodiment, at block 301, a transmission request to transmit a message is received. The transmitted message may be received by a server, such as the server 402 depicted in FIG. 4. The message may be composed in a messaging application that is either downloaded or previously installed on mobile phones, laptops, desktops, tablets, smart televisions and gaming devices, or other communication devices. The message may be received from a sender electronic device and addressed to be sent to a receiving electronic device.

At block 302, the relationship between the users of the sender electronic device and the receiving electronic device is determined. For example, a relationship between Sally and the recipient is determined. The server may access one or more accounts of the sender, and/or the sender profile, to determine the relationship between Sally and the receiver/recipient of the message. The server may also access the sender's social media accounts, work accounts, and email accounts to determine the relationship between the sender and the recipient. Voice inputs from electronic devices and IoT devices, including interactions with digital assistants, may also be used to determine relationship.

Once a relationship is determined, such as, for example, the recipient being Sally's cousin, as depicted in block 302, the relationship is further analyzed to determine the degree and strength of their relationship. Such analysis determines whether the relationship is a casual, weak, or strong, or some other degree and strength of relationship. Since Sally may have more than one cousin, simply being Sally's cousin may not be sufficient in determining the strength of their relationship. As such, analyzing one or more relationship factors and determining a relationship score for the analyzed factors, as depicted in block 303, may provide a more complete picture.

In some embodiments, a relationship score or a relationship level may be determine based on one or more relationship factors as depicted in block 303. For example, a relationship score between Sally and her cousin may be determined based on the frequency of their communications, i.e., if they communicate frequently, it is likely that their relationship is stronger than if they only communicate once in a while. Likewise, if they communicate frequently, it is likely that they have a higher comfort level with each other, which may translate to having a higher tolerance for each other.

As depicted, the relationship score determined in this example may be a "6" since Sally and her cousin communicate at least seven times a month. Although a 1-10 scale is used for scoring, other numbers, values, and scales and designations besides a number, such as high, medium, or low, may also be used.

In one embodiment, the server may rely on the relationship score calculated based on one of the relationship factors. In other embodiments, the server may calculate a relationship score based on one or more relationship factors and determine and overall average relationship score. For example, frequency of communications, last communicated, and online vs. in-person scores may be used to calculate an aggregated or overall score. Other combinations of relationship factors and their scores may also be used in computing an overall relationship score. For example, averages, means, or other formulae may also be applied to compute an overall relationship score. As depicted, in this embodiment, an aggregated score of "7" was determined.

At block 304, the server determined the type of message composed in the messaging application of the sender electronic device. The type of message may be a text message, an image, an image with text, an audio file, or a video.

In one embodiment, the server may apply the same processes as described in description of FIGS. 2, 3, 7, 8, and 10, to all types of messages or may apply any one of the processes described herein. For example, in some embodiments, a message that is an image may be treated differently from a message that is textual. For example, the message that is an image may be compared with other images in a database to determine whether it is appropriate, based on the relationship between the users of the sending and receiving devices, to transmit the message or display an alert or warning. A message that is textual may be analyzed for its words and context.

At block 305, one or more analysis factors from a plurality of analysis factors may be applied to determine a next course of action for the composed message. In some embodiments, the factors include language, gender, abusive words, anger or other emotion, work-related policies and things that may be considered inappropriate for work, nudity, image analysis, ethnicity, time, location, similarity to previous messages, and other factors as depicted in FIG. 14.

In some embodiments, each analysis factor may be given a score based on the earlier determined relationship score. For example, as depicted in block 306, an analysis factor, i.e., angry words, may be given a score based on the relationship score/level determined at block 303. As depicted, in one embodiment, since the aggregated relationship score was determined to be a "7" in block 303, the analysis factor, angry words, will be given a score that corresponds to the relationship score of "7," which is "8" in this example. Although a scale that has no scale of 1-10 was used, the embodiments are not so limited and other numbers, values, and scales and designations besides the scale depicted may also be used. For example, a scale of low, medium and high tolerance may also be used.

In this embodiment, a "7" score was configured for the analysis factor "angry words." This score is then used to determine whether the angry words used in the message, e.g., "hell" and "mad" are appropriate for transmitting to the designated recipient, Sally's cousin, based on their relationship. Since Sally communicates frequently with her cousin, e.g., seven times a month, giving a score of "7" to angry words, if the angry words used in the message are also rated a "7" or lower, then the server would determine that the message is appropriate to send. On the other hand, if the angry words cross the threshold of a "7," then the server would determine that the message should be delayed due to a likelihood that Sally may want to recall the message.

At block 307, a determination is made whether the message is within the threshold set for angry words, i.e., a score of "7." As mentioned earlier, a threshold may be set for a factor or an aggregated threshold may be set for one or more factors combined and the message may be compared against the set threshold to determine if it exceeds the threshold, i.e., making in inappropriate for transmitting to recipient. If a determination is made that the message exceeds the threshold, then, as depicted at block 307, the system determines a delay time period for the message. However, if a determination is made that the message does not exceed the threshold, then the system sends the message without any delay.

In this embodiment, the server determines a delay of 15 seconds for the message. The amount of time for the delay may be determined based on the sender's deletion history of previous messages, likelihood that the current message may be deleted, and other factors as described below in the description of FIGS. 14, and 16-18.

In some embodiments, the delay may be imbedded in a field of a header that is used to send the message. In other embodiments, the delay may be sent along with the payload of the message. The header of payload instructions would allow the server that is sending the message to delay the transmission of the message by the amount of delay time configured in the message. Some examples of the delay and the amount of delay based on the factors are provided in FIGS. 16-18.

In some embodiments, the receiving electronic device or the server associated with the receiving electronic device may determine that the message is not appropriate or that it is controversial and as such may delay the presentation of the message. By delaying the presentation, the receiving device or server may give an opportunity for the sending device or sending server to recall the message prior to the message being displayed to the recipient. In some embodiments, the notification payload can be received by the recipient's electronic device, but the presentation of the notification is delayed based on the value in the priority header field (e.g., delay presentation field). For example, a value of 1 may indicate that triggering the local display of notifications should occur after 30 seconds and a value of 2 may indicate a delay of 60 seconds and so on. The delay may be be specified in the priority header field and the amount of delay may be determined by the receiving server (or sending server) and may be based on historical recall data.

In some embodiments, the message may contain words or phrases that can be associated with a level of urgency or emergency. In such embodiments, the system may transmit the message to the recipient without any delay.

Figure 5:
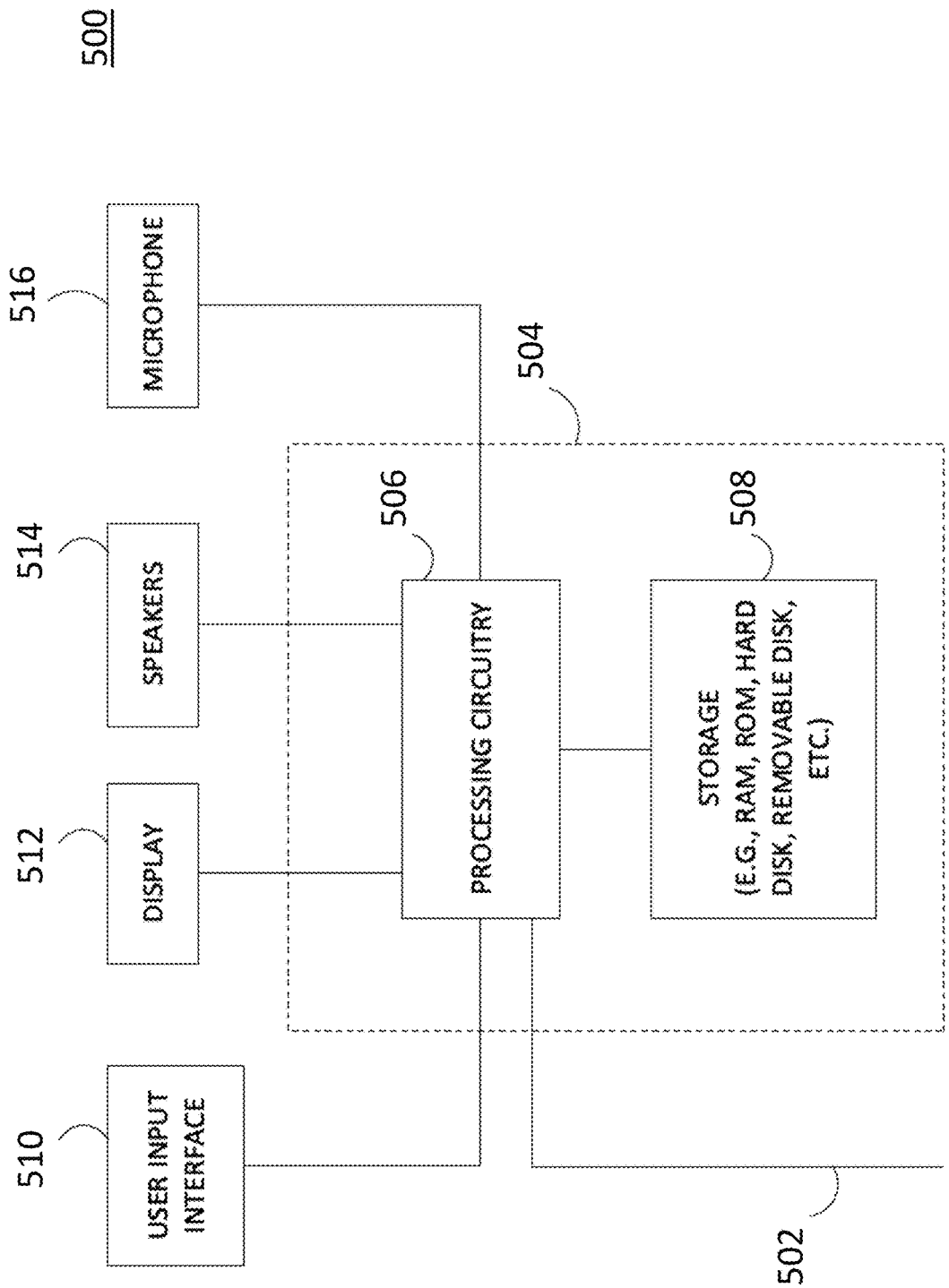
FIG. 5 is a block diagram of a user device used for composing or forwarding a message, in accordance with some embodiments of the disclosure.

FIG. 4 is a block diagram of an exemplary system for configuring an alert and determining delay period of a message, in accordance with some embodiments of the disclosure and FIG. 5 is a block diagram of a user device used for composing or forwarding a message, in accordance with some embodiments of the disclosure. FIGS. 4 and 5 also describe exemplary devices, systems, servers, and related hardware that may be used to implement processes, functions, and functionalities described in relation to FIGS. 2, 3, and 7-20. Further, FIGS. 4 and 5 may also be used to receive an indication of a message composed in a messaging application, receive a transmit request to transmit the message that is either composed or being forwarded, calculate relationship scores, calculate factor scores determine content of the message and analyze the content, determine if the content relates to an emergency, detect patters of recall and deletions of previous messages, watermark messages that are deemed inappropriate or controversial, where the watermarking may be done for messages received as well as messages sent to other users, highlight inappropriate messages, configure alerts, configure suggestions in the alerts, determine whether to display the alert, configure delay time periods for transmitting the message, calculate delay time periods based on patters, determine whether to both display an alert and delay the transmission or perform one or the other, determine types of relationship, determine types of messages, determine time and location of message to use it in determining an alert or a delay, implement and execute natural language, machine language, and artificial intelligence algorithms to make decision on generating an alert or delay the transmission, and all other processes and features described herein.

In some embodiments, one or more parts of, or the entirety of system 400, may be configured as a system implementing various features, processes, functionalities and components of FIGS. 2, 3, and 7-20. Although FIG. 4 shows a certain number of components, in various examples, system 400 may include fewer than the illustrated number of components and/or multiples of one or more of the illustrated number of components.

System 400 is shown to include a computing device 418, a server 402 and a communication network 414. It is understood that while a single instance of a component may be shown and described relative to FIG. 4, additional instances of the component may be employed. For example, server 402 may include, or may be incorporated in, more than one server. Similarly, communication network 414 may include, or may be incorporated in, more than one communication network. Server 402 is shown communicatively coupled to computing device 418 through communication network 414. While not shown in FIG. 4, server 402 may be directly communicatively coupled to computing device 418, for example, in a system absent or bypassing communication network 414.

Communication network 414 may comprise one or more network systems, such as, without limitation, an internet, LAN, WIFI or other network systems suitable for audio processing applications. In some embodiments, system 400 excludes server 402, and functionality that would otherwise be implemented by server 402 is instead implemented by other components of system 400, such as one or more components of communication network 414. In still other embodiments, server 402 works in conjunction with one or more components of communication network 414 to implement certain functionality described herein in a distributed or cooperative manner. Similarly, in some embodiments, system 400 excludes computing device 418, and functionality that would otherwise be implemented by computing device 418 is instead implemented by other components of system 400, such as one or more components of communication network 414 or server 402 or a combination. In still other embodiments, computing device 418 works in conjunction with one or more components of communication network 414 or server 402 to implement certain functionality described herein in a distributed or cooperative manner.

Computing device 418 includes control circuitry 428, display 434 and input circuitry 416. Control circuitry 428 in turn includes transceiver circuitry 462, storage 438 and processing circuitry 440. In some embodiments, computing device 418 or control circuitry 428 may be configured as media device 500 of FIG. 5.

Server 402 includes control circuitry 420 and storage 424. Each of storages 424 and 438 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 424, 438 may be used to store various types of content, metadata, and or other types of data (e.g., they can be used to store patters of recalls relating to the sender, knowledge graphs of relationships between sender and receiver, machine learning data, consumption histories, and NLP, ML, and AI algorithms). Non-volatile memory may also be used (e.g., to launch a boot-up routine and other instructions). Cloud-based storage may be used to supplement storages 424, 438 or instead of storages 424, 438. In some embodiments, data relating to receiving an indication of a message composed in a messaging application, receiving a transmit request to transmit the message that is either composed or being forwarded, calculating relationship scores, calculating factor scores determine content of the message and analyze the content, determining if the content relates to an emergency, detecting patters of recall and deletions of previous messages, watermark messages that are deemed inappropriate or controversial, where the watermarking may be done for messages received as well as messages sent to other users, highlight inappropriate messages, configuring alerts, configuring suggestions in the alerts, determining whether to display the alert, configuring delay time periods for transmitting the message, calculating delay time periods based on patters, determining whether to both display an alert and delay the transmission or perform one or the other, determining types of relationship, determining types of messages, determining time and location of message to use it in determining an alert or a delay, implementing and executing natural language, machine language, and artificial intelligence algorithms to make decision on generating an alert or delay the transmission, and data relating to all other processes and features described herein, may be recorded and stored in one or more of storages 412, 438.

In some embodiments, control circuitry 420 and/or 428 executes instructions for an application stored in memory (e.g., storage 424 and/or storage 438). Specifically, control circuitry 420 and/or 428 may be instructed by the application to perform the functions discussed herein. In some implementations, any action performed by control circuitry 420 and/or 428 may be based on instructions received from the application. For example, the application may be implemented as software or a set of executable instructions that may be stored in storage 424 and/or 438 and executed by control circuitry 420 and/or 428. In some embodiments, the application may be a client/server application where only a client application resides on computing device 418, and a server application resides on server 402.

The application may be implemented using any suitable architecture. For example, it may be a stand-alone application wholly implemented on computing device 418. In such an approach, instructions for the application are stored locally (e.g., in storage 438), and data for use by the application is downloaded on a periodic basis (e.g., from an out-of-band feed, from an internet resource, or using another suitable approach). Control circuitry 428 may retrieve instructions for the application from storage 438 and process the instructions to perform the functionality described herein. Based on the processed instructions, control circuitry 428 may determine a type of action to perform in response to input received from input circuitry 416 or from communication network 414. For example, in response to determining that a message is composed, a message is being forwarded, or a request for transmission of the message is sent, the control circuitry 428 may perform the steps of process described in FIGS. 2, 3, 7, 8, and below and all the steps and processes described in all the figures depicted herein.

In client/server-based embodiments, control circuitry 428 may include communication circuitry suitable for communicating with an application server (e.g., server 402) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 414). In another example of a client/server-based application, control circuitry 428 runs a web browser that interprets web pages provided by a remote server (e.g., server 402). For example, the remote server may store the instructions for the application in a storage device. The remote server may process the stored instructions using circuitry (e.g., control circuitry 428) and/or generate displays. Computing device 418 may receive the displays generated by the remote server and may display the content of the displays locally via display 434. This way, the processing of the instructions is performed remotely (e.g., by server 402) while the resulting displays, such as the display windows described elsewhere herein, are provided locally on computing device 418. Computing device 418 may receive inputs from the user via input circuitry 416 and transmit those inputs to the remote server for processing and generating the corresponding displays. Alternatively, computing device 418 may receive inputs from the user via input circuitry 416 and process and display the received inputs locally, by control circuitry 428 and display 434, respectively.

Server 402 and computing device 418 may transmit and receive content and data such as objects, frames, snippets of interest, and input from primary devices and secondary devices, such as AR devices. Control circuitry 420, 428 may send and receive commands, requests, and other suitable data through communication network 414 using transceiver circuitry 460, 462, respectively. Control circuitry 420, 428 may communicate directly with each other using transceiver circuits 460, 462, respectively, avoiding communication network 414.

It is understood that computing device 418 is not limited to the embodiments and methods shown and described herein. In nonlimiting examples, computing device 418 may be a primary device, a personal computer (PC), a laptop computer, a tablet computer, a WebTV box, a personal computer television (PC/TV), a PC media server, a PC media center, a handheld computer, a mobile telephone, a smartphone, a virtual, augment, or mixed reality device, or a device that can perform function in the metaverse, or any other device, computing equipment, or wireless device, and/or combination of the same capable of suitably displaying primary content and secondary content.

Control circuitry 420 and/or 418 may be based on any suitable processing circuitry such as processing circuitry 426 and/or 440, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 420 and/or control circuitry 418 are configured to receive an indication of a message composed in a messaging application, receive a transmit request to transmit the message that is either composed or being forwarded, calculate relationship scores, calculate factor scores determine content of the message and analyze the content, determine if the content relates to an emergency, detect patters of recall and deletions of previous messages, watermark messages that are deemed inappropriate or controversial, where the watermarking may be done for messages received as well as messages sent to other users, highlight inappropriate messages, configure alerts, configure suggestions in the alerts, determine whether to display the alert, configure delay time periods for transmitting the message, calculate delay time periods based on patters, determine whether to both display an alert and delay the transmission or perform one or the other, determine types of relationship, determine types of messages, determine time and location of message to use it in determining an alert or a delay, implement and execute natural language, machine language, and artificial intelligence algorithms to make decision on generating an alert or delay the transmission, and perform all processes described and shown in connection with FIGS. 2, 3, 7, 8, and 10.

Computing device 418 receives a user input 404 at input circuitry 416. For example, computing device 418 may receive a user input like composing of a message in a messaging application or an input to transmit the message.

Transmission of user input 404 to computing device 418 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 416 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 440 may receive input 404 from input circuit 416. Processing circuitry 440 may convert or translate the received user input 404 that may be in the form of voice input into a microphone, or movement or gestures to digital signals. In some embodiments, input circuit 416 performs the translation to digital signals. In some embodiments, processing circuitry 440 (or processing circuitry 426, as the case may be) carries out disclosed processes and methods. For example, processing circuitry 440 or processing circuitry 426 may perform processes as described in FIGS. 2, 3, 7, 8, and 10, respectively.

FIG. 5 shows a generalized embodiment of an electronic equipment device 500, in accordance with one embodiment. In an embodiment, the equipment device 500, is the same equipment device 402 of FIG. 4. The equipment device 500 may receive content and data via input/output (I/O) path 502. The I/O path 502 may provide audio content (e.g., broadcast programming, on-demand programming, internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Figure 6:
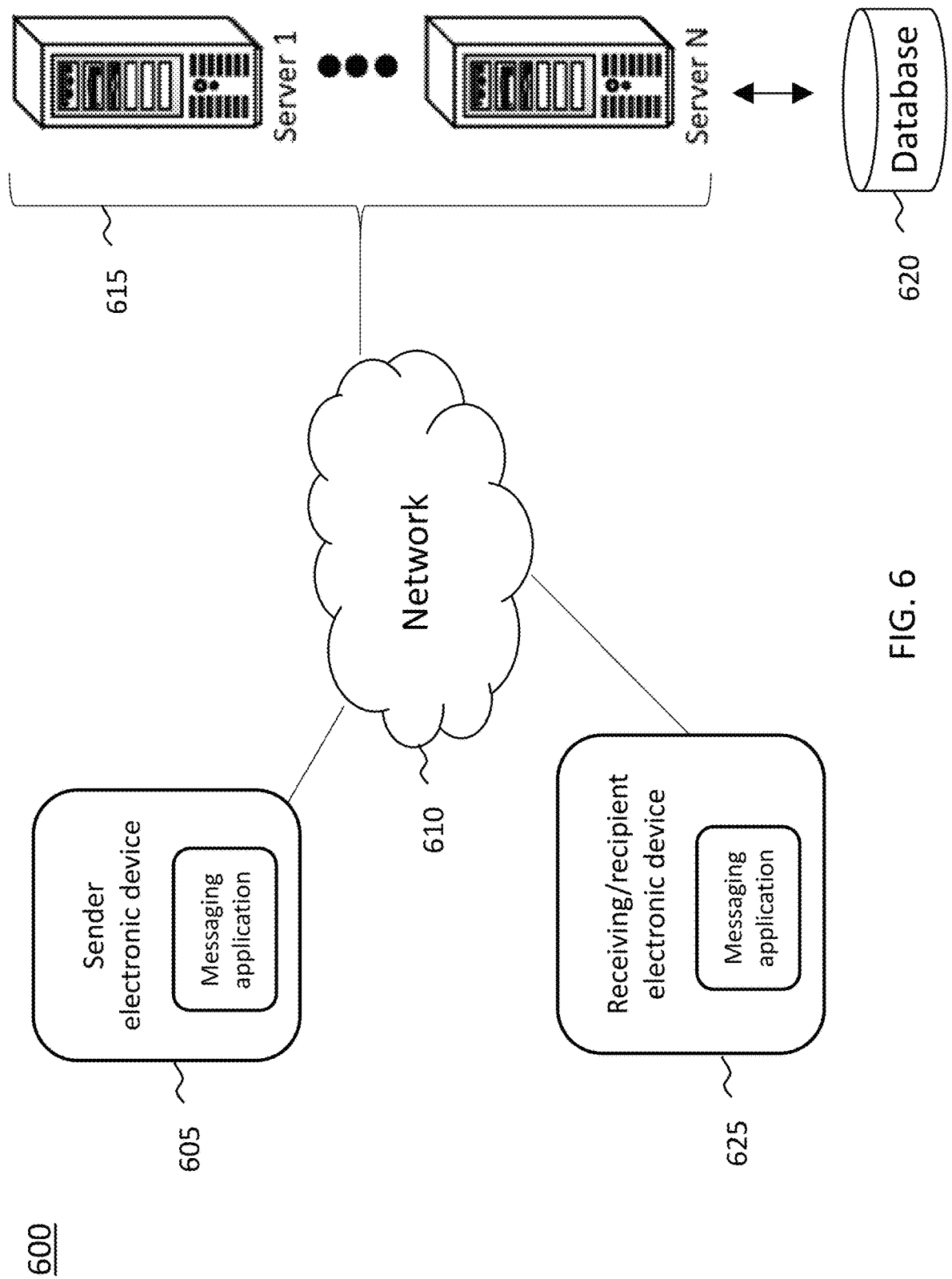
FIG. 6 is a block diagram of components of a system to communicate between sender, recipient, and server devices, in accordance with some embodiments of the disclosure.

The communications between two separate user devices, such as the sending electronic device and the receiving electronic device to send a message, or communications between two separate user devices, such as the sending electronic device and the server, such as the servers 615 in FIG. 6, to receive an indication of a message composed in a messaging application, receive a transmit request to transmit the message that is either composed or being forwarded, calculate relationship scores, calculate factor scores determine content of the message and analyze the content, determine if the content relates to an emergency, detect patters of recall and deletions of previous messages, watermark messages that are deemed inappropriate or controversial, where the watermarking may be done for messages received as well as messages sent to other users, highlight inappropriate messages, configure alerts, configure suggestions in the alerts, determine whether to display the alert, configure delay time periods for transmitting the message, calculate delay time periods based on patters, determine whether to both display an alert and delay the transmission or perform one or the other, determine types of relationship, determine types of messages, determine time and location of message to use it in determining an alert or a delay, implement and execute natural language, machine language, and artificial intelligence algorithms to make decision on generating an alert or delay the transmission, and all other processes and features described herein, can be at least partially implemented using the control circuitry 504. The processes as described herein may be implemented in or supported by any suitable software, hardware, or combination thereof. They may also be implemented on user equipment, on remote servers, or across both.

In client-server-based embodiments, the control circuitry 504 may include communications circuitry suitable for allowing communications between two separate user devices to receive an indication of a message composed in a messaging application, receive a transmit request to transmit the message that is either composed or being forwarded, calculate relationship scores, calculate factor scores determine content of the message and analyze the content, determine if the content relates to an emergency, detect patters of recall and deletions of previous messages, watermark messages that are deemed inappropriate or controversial, where the watermarking may be done for messages received as well as messages sent to other users, highlight inappropriate messages, configure alerts, configure suggestions in the alerts, determine whether to display the alert, configure delay time periods for transmitting the message, calculate delay time periods based on patters, determine whether to both display an alert and delay the transmission or perform one or the other, determine types of relationship, determine types of messages, determine time and location of message to use it in determining an alert or a delay, implement and execute natural language, machine language, and artificial intelligence algorithms to make decision on generating an alert or delay the transmission, and all related functions and processes as described herein. The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 508 may be used to store patters of recalls relating to the sender, knowledge graphs of relationships between sender and receiver, machine learning data, consumption histories, and NLP, ML, and AI algorithms and all the functionalities and processes discussed herein. Cloud-based storage, described in relation to FIG. 5, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the electronic device 500. The control circuitry 504 may also include digital-to-analog converter circuitry and analog-to-digital converter circuitry for converting between digital and analog signals. The tuning and encoding circuitry may be used by the electronic device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the electronic device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing. In some embodiments, voice assistants (e.g., Siri, Alexa, Google Home and similar such voice assistants) receive and process the voice commands and other speech.

The electronic device 500 may include an interface 510. The interface 510 may be any suitable user interface, such as a remote control, mouse, trackball, keypad, keyboard, touch screen, touchpad, stylus input, joystick, or other user input interfaces. A display 512 may be provided as a stand-alone device or integrated with other elements of the electronic device 500. For example, the display 512 may be a touchscreen or touch-sensitive display. In such circumstances, the interface 510 may be integrated with or combined with the microphone 516. When the interface 510 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of electronic device 500 or may be a stand-alone unit. In some embodiments, the display 512 may be outputted through speaker 514.

The equipment device 500 of FIG. 5 can be implemented in system 400 of FIG. 4 as primary equipment device 402, but any other type of user equipment suitable for allowing communications between two separate user devices for performing the functions elated to implementing machine learning (ML) and artificial intelligence (AI) algorithms, and all the functionalities discussed associated with the figures mentioned in this application The electronic device 500 of any other type of suitable user equipment suitable may also be used to implement ML and AI algorithms, and related functions and processes as described herein. For example, primary equipment devices such as television equipment, computer equipment, wireless user communication devices, or similar such devices may be used. Electronic devices may be part of a network of devices. Various network configurations of devices may be implemented and are discussed in more detail below.

FIG. 6 is a block diagram of a components of a system to communicate between sender, recipient, and server devices, in accordance with some embodiments of the disclosure. In some embodiments, the system 600 includes one or more sending electronic devices 605, one or more of receiving electronic devices 625, one or more servers 615, and one or more databases 620 that are communicatively connected to each other via network 610.

In one embodiment, sender electronic device 605 and the receiving electronic device include a messaging application. The messaging application may be downloaded by the user of the electronic device or may have been previously installed as a factory setting on the electronic device. The messaging application includes a graphical user interface that can be used to communicate between sending and receiving electronic devices. Users of the messaging application are able to compose the message, create groups, create contacts, visually see from whom messages are received and to whom a message is being sent, attach images and voice notes and perform standard messaging platform operations. Some examples of such messaging applications include WhatsApp, Google hangouts, WeChat, Viber, Facebook Messenger, Instagram, Microsoft Teams, Zoom, Yammer, Slack, PlayStation, and Xbox.

In one embodiment, the sender electronic device communicates with the server via network 610. Using this communication channel, the server is able to get notification of a message being composed in the sender electronic device or receive a request to transmit a message to the receiving electronic device.

In some embodiments, the server may access a database that includes a plurality of words, phrases, and images that can be used by the server to determine if a message being sent to the receiving electronic device is appropriate. For example, the server may compare the content of the message with contents of the database to determine its appropriateness. The server may also store machine learning data, such as patterns observed based on prior interactions of the sender electronic device with the receiving electronic device and other recipients.

In some embodiments, the server may determine the relationship between the sender electronic device and the receiving electronic device and transmit the message from the sender electronic device to the receiving electronic device based on a relationship score. Such relationship scores, relationship factors that are used in generating the relationship scores, and application factors that are also determined based on relationship scores may all be stored in the database. Although some components of the system are described, the embodiments are not so limited, and more or fewer components may also be used. The system 600 may be used to execute processes, such as those described in FIGS. 2, 3, 7, 8, and 10. System 600 may also be used to generate knowledge graphs as depicted in FIG. 11.

Figure 7:
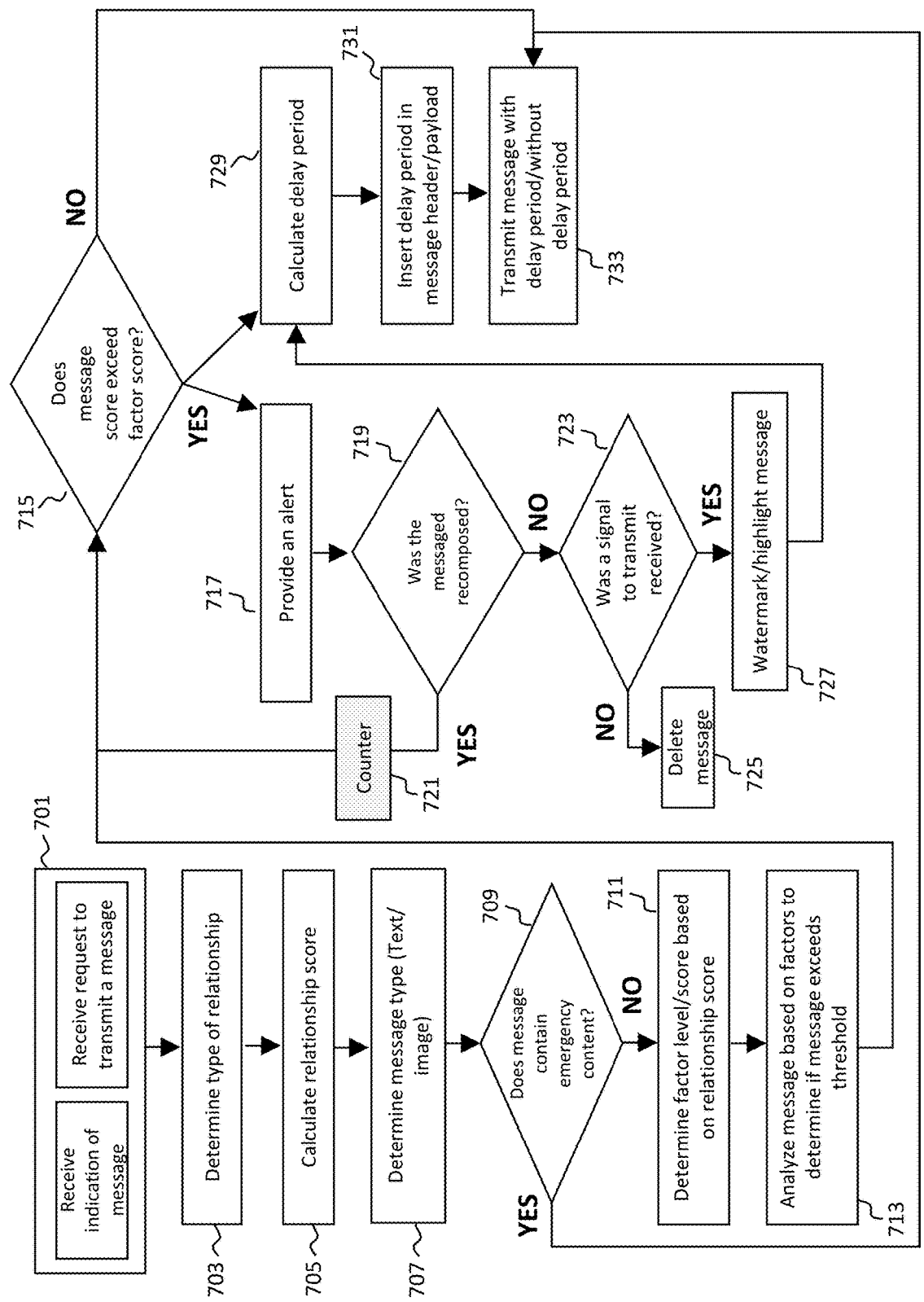
FIG. 7 is flowchart of a process for determining alerts and delays of a message composed in a messaging application, in accordance with some embodiments of the disclosure.

FIG. 7 is flowchart of a process for determining alerts and delays of a message composed in a messaging application, in accordance with some embodiments of the disclosure.

In one embodiment, at block 701, either an indication of a message being composed is received or a request to transmit the composed message is received. The indication and/or request may be received by a server, such as the server 402 depicted in FIG. 4.

The indication of a message being composed is received in response to the sender beginning to compose a message in a messaging application (or upon the completion of the message being composed), and the transmission request is received once a sender selects a send option for the composed message.

The message application described above is an application that may be downloaded or previously installed, such as factory-installed, on mobile phones, laptops, desktops, tablets, smart televisions and gaming devices, or other communication devices. Some examples of such messaging applications include WhatsApp, Google hangouts, WeChat, Viber, Facebook Messenger, Instagram, Microsoft Teams, Zoom, Yammer, Slack, PlayStation, and Xbox.

In response to receiving the indication or the transmission request, the server identifies the addressee of the message, i.e., the receiver (also known as a recipient) to whom the message is addressed. This information may be identified by the server based on the recipient's email, phone number, or some other address of the recipient that is inputted by the sender of the message.

The server then, at block 703, determines the type of relationship between the user of the sender electronic device and the addressee, i.e., the user of the receiving electronic device. Some examples of such determinations are depicted in FIG. 11, and additional details are described in connection with blocks 202 and 203 of FIG. 2 and blocks 302 and 303 of FIG. 3. Based on the determined relationship, the server may also generate a knowledge graph, such as the knowledge graph depicted in FIG. 11. The knowledge graph may associate the relationship with other details learned about the recipient from previous conversations, such as the recipient's age, preferences, gender, ethnicity, etc.

In some embodiments, the server may determine the type of relationship based on information in the sender's profile or sender's contacts stored on their electronic device. For example, sender may have stored the recipient's contact information in their phone or their laptop along with a description of their relationship, such as friend or cousin, or the sender may have listed the name of the recipient's workplace, which the server may determine is the same workplace as the sender. In other embodiments, the server may access one or more accounts associated with the sender, such as their social media accounts, work accounts, and email accounts and determine the relationship between the sender and the recipient based on analysis of the data from these accounts.

The server may also access conversations between the sender and a digital assistant, such as Alexa™ by Amazon™ or Siri™ by Apple™ or Google Assistant™ by Google™, to determine a relationship between the sender and the recipient of the message. For example, the sender may have queried the digital assistant to buy a gift for the recipient and may have referred to the recipient as "Ron my cousin." Or the sender may have asked the digital assistant to call "Ron my cousin" or used Ron's name and mentioned the relationship in some other context. The server may use such input to determine the relationship.

In other embodiments, the server may also access voice inputs from an electronic device, such as mobile phone, to determine the relationship between the sender and the recipient.

As depicted in block 705, a relationship score may be calculated. The relationship score, in some embodiments, is based the degree and strength of the relationship. The relationship score allows the system to classify the relationship into a plurality of buckets ranging from the frequency of interaction (e.g., infrequent to daily) and from weak to casual to strong, or some other degree and strength of relationship. Some relationship factors used to determine the strength of the relationship include, frequency of communications, last communicated, online vs. in-person, years known, close family ties, first or second degree of family, and other relationship factors. For example, a relationship score or a relationship level may be determined based on one or more relationship factors as depicted in blocks 203 and 303.

The relationship score may be determined for every relationship factor or only for some relationship factors. Each relationship score for a specific factor may reflect a strength of the relationship, i.e., a high score for a relationship factor "years known" would reflect that the strength of the relationship is high if the sender and recipient have known each other for many years. Likewise, a low score may reflect that the relationship is not as strong based on a lower number of years known.

In one embodiment, the server may calculate the relationship score based on one of the relationship factors. In other embodiments, the server may calculate a relationship score based on one or more relationship factors and determine and overall average relationship score. Other combinations of relationship factors and their scores may also be used in computing an overall relationship score. For example, averages, means, or other formulae may also be applied to compute an overall relationship score.

At block 707, the server determines the type of message composed in the messaging application of the sender electronic device or the type of message requested to be transmitted to the recipient. The type of message may be a text message, an image, an image with text, an audio file, or a video.

In one embodiment, at block 709, the server may determine if the message contains words that can be associated with a level of urgency or an emergency. For example, words such as doctor, hospital, police, ambulance, fire engine, fire, accident, hurt, bleeding, unconscious, urgent, emergency, critical, or other words and phrases may be associated by the server with a current or imminent emergency. If a determination is made that the content of the message relates to an urgency or an emergency, then the server may bypass the remaining blocks in FIG. 7 and transmit the message without any delay and without any alerts, such as depicted at block 733.

In another embodiment, if a determination is made at block 709 that the message is not urgent and does not relate to an emergency, then, at block 711, the server determines a score for one or more analysis factors based on the relationship score determined at block 705. In some embodiments, the analysis factors include language, gender, abusive words, anger or another emotion, work-related policies and things that may be considered inappropriate for work, nudity, image analysis, ethnicity, time, location, similarity to previous messages, and other factors as depicted in FIG. 14. Some examples of the factors and scores determined are provided in the description related to block 205 of FIG. 2, block 305 of FIG. 3, and FIG. 14.

Depending on the type of message determined at block 707, at block 711, the server may either analyze the words and phrases of the message or compare the image to other images in an image library to determine a score or category for the message. The message score may later be used to determine the appropriateness of the message and whether an alert should be posted, or the message should be delayed, depending upon the relationship between the sender and the recipient.

In some embodiments, the score or degree of the analysis factor(s) determined at block 711 is used in analyzing the content of the composed message, as depicted at block 713, to determine whether the message is appropriate for sending to the designated recipient. In some embodiments, a single factor score may be used and in other embodiments an aggregated factor score based on multiple factors may be used. For example, if the message contains content that is relevant to only one of the factors, such as angry words, then other factors may not be analyzed.

At block 715, a determination is made whether the message score exceeds the analysis factor score. The determination involves, in one embodiment, giving a score to the angry words in the message, then comparing the score to the score given to the analysis factor at block 711. If the message score exceeds the analysis factor score, then the message may be inappropriate based on the relationship between the sender and recipient. If the message score does not exceed the analysis factor score, then the message may be acceptable.

In another embodiment, the words of the message are compared to the score threshold from block 711. In some embodiments, the server may use a natural language processing (NLP) engine running an NLP algorithm and an artificial intelligence (AI) engine running an AI algorithm to determine whether the words or phrases in the message, or the images, exceed the threshold set for the analysis factor at block 711.

If a determination is made at block 715 that the message score does not exceed the threshold score, then, the message may not receive any alerts and may be transmitted, such as at block 733, without any delay. In another embodiment, even when the message score does not exceed the threshold score, if there are past occurrences in which the sender has deleted similar messages to the same recipient, then, based on past deletion history, which may be obtained based on machine learning applications, the server may apply a delay to the message. Examples of using past occurrences in evaluating delay are described further in relation to FIGS. 16 and 19.

Figure 9:
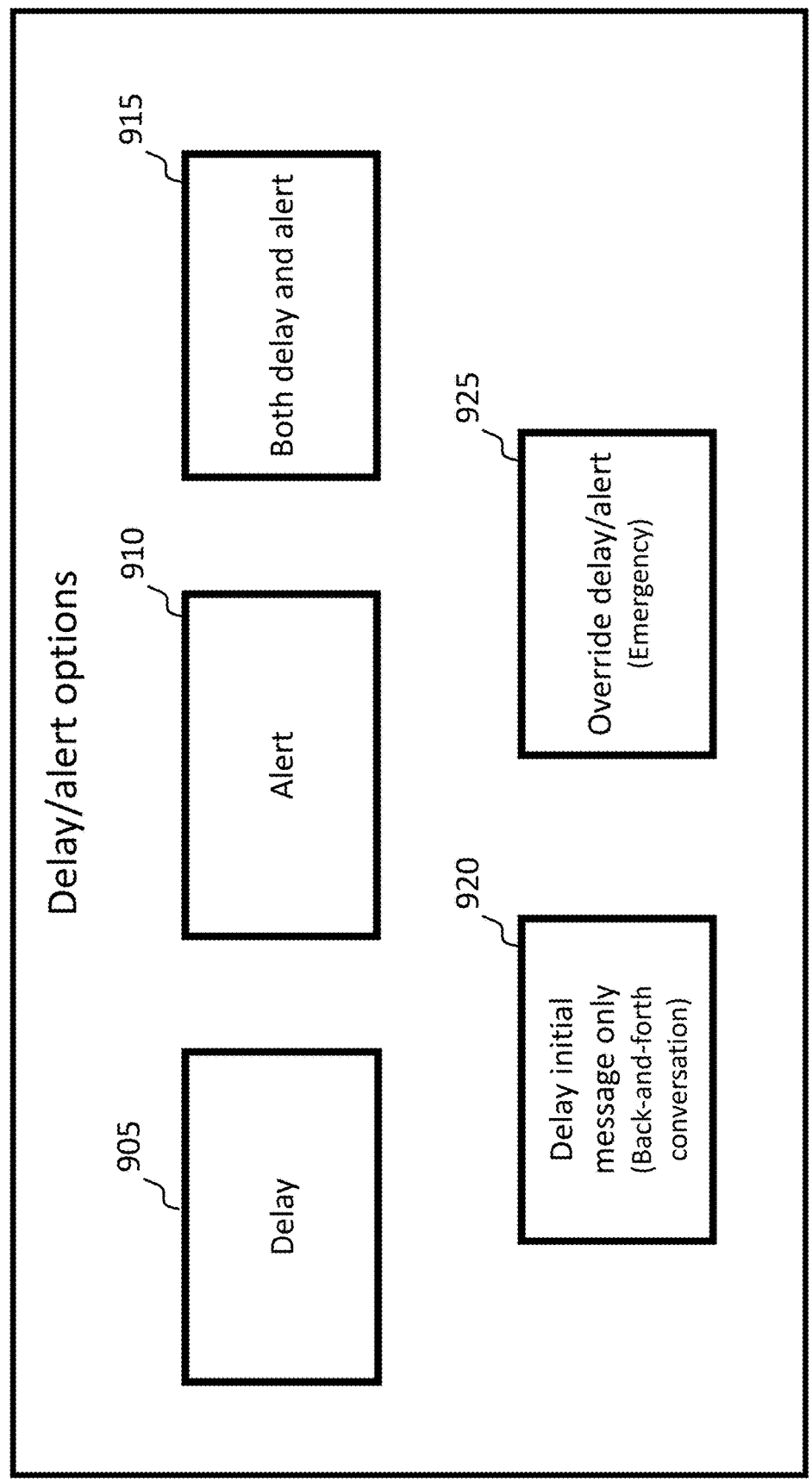
FIG. 9 is a block diagram of delay/alert options used in processing a message of a messaging application, in accordance with some embodiments of the disclosure.

If a determination is made at block 715 that the message score does exceed the threshold score, then, the message may receive an alert, such as at block 717; be subject to a delay, such as at block 731; or both receive an alert and, in response to the sender overriding the alert, receive a delay, as further described in FIG. 9.

In one embodiment, if a determination is made at block 715 that the message score exceeds the factor score, i.e., which is used as a threshold, then, as depicted at block 717, the system displays an alert on the sender electronic device. If the message is an image, then, in some embodiments, the path depicted in blocks 729-733 may be followed instead of providing an alert.

As depicted at the fork following block 715, in one embodiment, either a path that includes blocks 717-727 may be followed or the path in blocks 717-727 may be bypassed and the process may proceed directly from block 715 to blocks 729-733. For example, in one embodiment, the system may first provide an alert on the sender's electronic device if it determines that the message score does exceed the threshold score. The alert may be a used as a first warning or a first measure to prevent an inappropriate or controversial message from being sent and may be used to correct the message at the time while it is still being composed. If the user ignores the alert or bypasses the alert, then as a second measure to prevent the inappropriate or controversial message from being sent.

In some embodiments, the process may bypass blocks 717-727 and delay the message. This may be automatically selected if the system recognizes, such as based on historical message data, that the user typically has recalled messages to the recipient or recalled message or the same genre or related emotional. For example, if the sender at a certain hour of the day, such as past midnight, or when in certain mood, such as angry, or whenever messaging this particular recipient has recalled the message over a threshold percentage of times, then the system may automatically delay the message and use process of blocks 729-733.

Delays may also automatically be appended to the notification payload of the message at the application server. Such automatic delay may be configured based on various criteria such as, the local time of the recipient, location of the sender or recipient, last time their phone was active and in use; relationship strength or category between sender and receiver, type of message (text, forward, video, meme, etc.), how often does the sender request deletion of the message when communicating with the recipient, or other recipients, when the sender (on average) makes a deletion request (e.g., 40 seconds after sending the text, etc.).

Although certain paths in the forks are discussed above, the embodiments are not so limited and all combinations of blocks 717-733 and various paths are contemplated based on their need. For example, in one embodiment, the system may provide an alert but no delay, if the sender dismisses the alert and the message doesn't meet a delay criterion, such as no prior history of recalls or other reasons for delay as discussed in relations to FIGS. 9 and 14.

When an alert is used, in some embodiments, the user may be informed of a pop-up message that appears in the messaging app. In other embodiments, the alert or error message may be provided as a text message. Other formats of alerts are also contemplated.

In some embodiments, the alert message may identify the reasons for the alert and provide suggestions. Some examples of alerts and suggestions are provided in FIGS. 19A and 19B. The suggestions may provide other words, phrases, sentence structures or thoughts and ideas, which may be obtained from an artificial intelligence (AI) engine running an AI algorithm to determine what is acceptable and not inappropriate language. In other embodiments, the content of the message, such as the words and phrases, may be compared to a database of words and phrases to determine if the words and phrases composed in the message are inappropriate.

In other embodiments, the alert may simply be an error or warning message, without any suggestions, notifying the sender that the content of the message is inappropriate.

At block 719, a determination may be made, after the alert has been displayed on the sender electronic device, of whether the message has been recomposed or the suggestions provided have been accepted by the sender. In one embodiment, the sender may have recomposed the message on their own and removed words or phrases that were the reason why the message exceeded the threshold of the analysis factor. In another embodiment, the sender may have accepted the suggestions provided by the server.

If a determination is made that the message was recomposed, then the system may loop back to block 715 to determine if the recomposed message exceeds the factor threshold. Blocks 715, 717, and 719 may be part of a loop where the message is reevaluated every time it is recomposed until a counter limit is reached. For example, the server may predetermine the counter limit, such as 2 or 3, after which a recomposed message may not be analyzed.

If a determination is made at block 719 that the message was not recomposed or that the suggestions made in the alert were not accepted, then the process moves to block 723, where a determination is made of whether a signal was received to transmit the message, i.e., despite the alert.

If a determination is made that a signal to transmit was received and a message has not been recomposed or that the suggestions in the alert were not accepted, then, at block 727, the server may watermark messages that are deemed inappropriate or controversial. Watermarking, as defined herein, includes superimposition of text or a logo on a picture or frames of a video. The watermarking may identify the message as inappropriate or controversial and may include a warning. For example, the warning may be text such as "This message may contain inappropriate material," "This message is not suitable for recipients under 17," "Open in private," or some other message or warning alerting the recipient that the message may not be appropriate or identifying a minimum age limit of the recipient for the message.

Watermarking, as described herein, may be performed for messages received as well as messages sent to other users. In one embodiment, messages sent to others may be watermarked with text, symbol, or image to alert the receiver that the message may contain inappropriate content. In one embodiment, messages that are received may be deemed inappropriate or controversial. These messages may include images and/or videos. In some embodiments, the AI engine may determine whether they are inappropriate and controversial and in other embodiments an ML engine may make such a determination based on the user's prior consumption history of messages received. In yet another embodiment, the server may deem the messages as inappropriate or controversial based on the receiving user's profile. In yet another embodiment, messages, such as messages with multiple forwards, may be deemed controversial after (e.g., deleted from social networks) and are flagged to the messaging application if the ID of the message is known or the content of the message contains a watermark that can be traced.

In some embodiments, an alert may also be presented to the sender before sharing such message. Messages that may contain pornography, including child pornography, or images of child sexual abuse may be evaluated based on their fingerprint or elements within the image or video that may fit the description of such an inappropriate message and be flagged for watermarking or deletion.

In one embodiment, metadata associated with objects (e.g., pictures or videos) resident on a user device is updated after it was received/downloaded. For example, the video may not have been controversial when it was received but became controversial after some occurrence of an event. This could also trigger the alert to not share it and/or to delete the message from the user's electronic device. In one embodiment, pictures/videos are not recommended to be shared with other users or to be stored on the user device area highlighted for the user (e.g., moved to a different folder) or tagged for easy identification. Similarly, these pictures/videos can be automatically watermarked locally (e.g., by a watermarking service that is native to the OS) or in response to remote trigger to insert such watermark. Similarly, some content may be automatically deleted if similar content has been previously deleted by users (e.g., unwatched/deleted)—using the similarity score. The recipient can still be informed via a generic message or an alert (e.g., a video was sent to you but was not downloaded) and given the option to verify and approve/reject.

At block 729, since the user may have ignored the alert and selected an option to transmit the message to the recipient, the server may calculate the amount of delay for the message. The amount of delay may be determined based on a plurality of factors that are used in anticipating the likelihood of the message being recalled or deleted by the sender. For example, the server may determine if the sender has previously deleted or recalled messages to the same recipient. The system may also evaluate whether the sender has a habit of deleting or recalling messages similar to the message composed to other recipients. Additional details of factors used in determining the amount of delay are described in relation to examples depicted in FIGS. 14, and 16-18.

At block 731, the server may insert the delay calculated either in a header field of the message or attach it to the message payload. The server, at block 733, transmits the message with the delay period to the receiving device. The receiving server or the receiving electronic device may follow the delay instructions and accordingly delay transmission or display the message on the recipient's electronic device until the expiration of the delay period.

Figure 8:
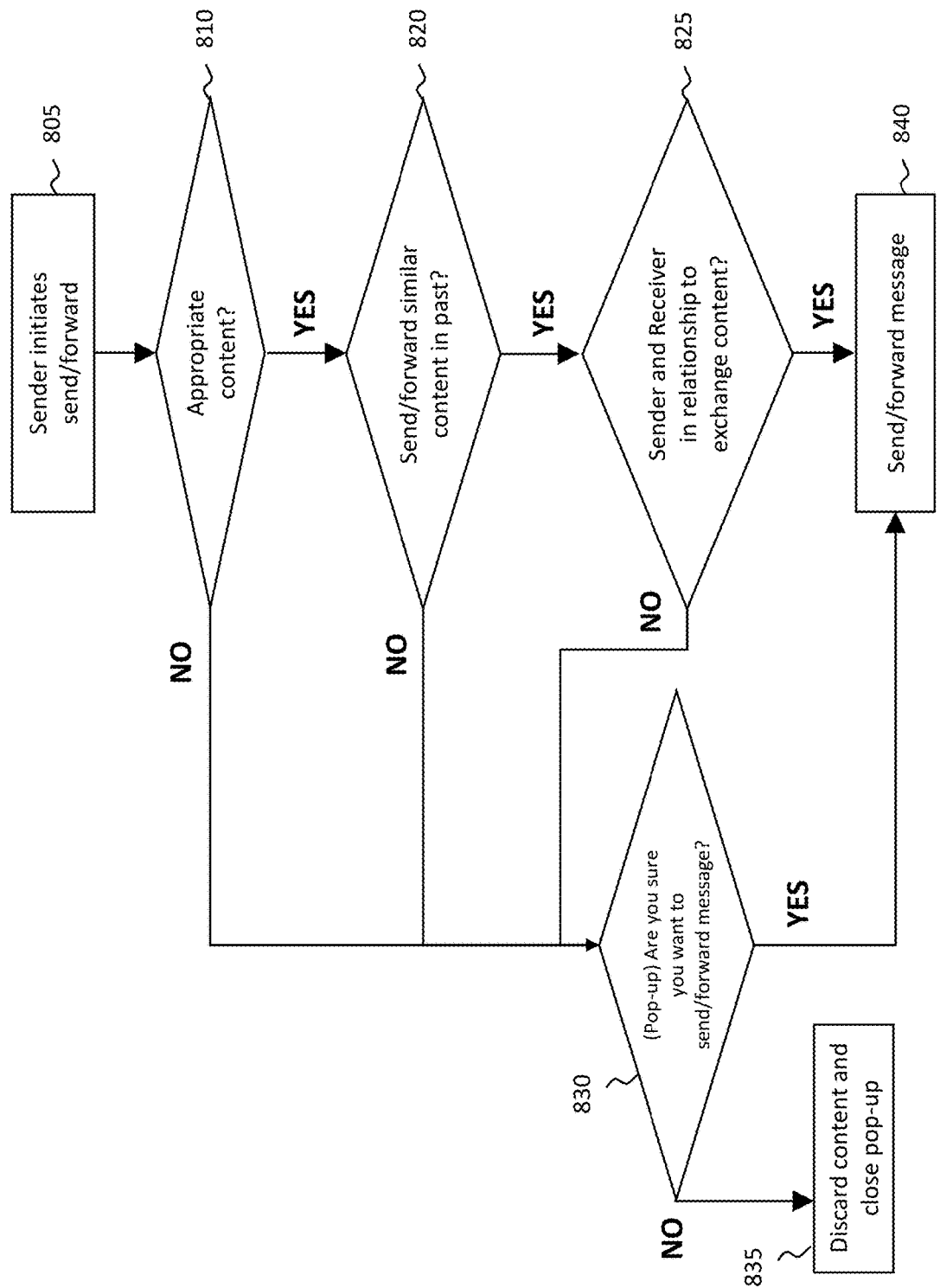
FIG. 8 is flowchart of a process for determining display of an alert for a message composed in a messaging application, in accordance with some embodiments of the disclosure.

FIG. 8 is flowchart of a process for determining display of an alert for a message composed in a messaging application, in accordance with some embodiments of the disclosure.

At block 805, a server receives an indication of a sender initiating a send or a forward request for a message that is either composed by the sender in a messaging application or received by the sender in the messaging application that the sender is attempting to forward to other recipients.

At block 810, the server determines whether the content of the message is appropriate. To determine appropriateness, the server may use one or more of an NLP engine, an AI engine, or a machine learning (ML) engine and execute any one or more of NLP, AI, and ML algorithms. The server may also compare the content of the message with a library of key words, phrases, and images to determine appropriateness of the content.

If a determination is made at block 810 that the content of the message is not appropriate, then the server may, at block 830, provide a pop-up alert on the sender's electronic device. The pop-up may include a warning or a message alerting the sender of message and, in some embodiments, providing alternate language that is appropriate. The alert may be to warn or caution the sender that the content of the message is not appropriate to send to the recipient based on their relationship strength. The alert may provide options to the sender to delete the message, recompose the message with alternate language or images, accept alternate suggestions provided by the server, or override the alert and transmit to sender.

If no response is received, or a response is received to delete the message, then, at block 835, the server may discard the content and close the pop-up.

If a determination is made at block 810 that the content is appropriate, then, at block 820, the server may determine if similar content was sent or forwarded by the sender previously to the same recipient. If a determination is made at block 820 that such content was not previously sent, then the process as depicted in blocks 830 and 835 may be followed.

If a determination is made at block 820 that such content was previously sent, then the process moves to block 825.

At block 825, the server may determine the relationship between the sender and recipient to determine if such a relationship allows exchange of the content. As described above in reference to FIGS. 2 and 3, a relationship and its strength may be determined for the relationship between the sender and the recipient. Based on the determined relationship and its strength, the server may also generate a knowledge graph, such as the knowledge graph depicted in FIG. 11. The knowledge graph may associate the relationship with other details learned about the recipient from previous conversations, such as the recipient's age, preferences, gender, ethnicity, etc.

If a determination is made that the relationship between the sender and the recipient is at a level or degree that allows such content to be exchanged, then, at block 840, the server may transmit the message to the recipient without displaying a pop-up on the sender's electronic device.

In some embodiments, even if content is deemed inappropriate at block 810 and if it was not previously sent at block 820, the content may still be sent to the recipient relationship at block 825 is deemed as a strong relationship having a score that meets the threshold factor score. In some embodiments, if a determination is made that the content was previously sent to the recipient, then block 825 may be bypassed since the recipient has already seen or is used to receiving such content from the sender.

If the server detects, at block 805, or any other block that any part of the message rises to the level of an urgency or emergency, then the server may bypass the steps at blocks 810 to 825 and transmit the message to the recipient immediately.

FIG. 9 is a block diagram of delay/alert options used in processing a message of a messaging application, in accordance with some embodiments of the disclosure.

Delay and alert options 900 may be applied by the server for a message that is being composed, being forwarded, or for which a transmission request is received. The message may be an image, text, voice note, or some combination thereof.

In some embodiments, as depicted in block 905, the server may delay the transmission of the message to the receiving electronic device. This may also be determined based on past occurrences of deleting or recalling a message by the sender to this specific recipient as well as generally to other recipients. It may also be determined based on the amount of time the sender took previously to recall or delete a message, and the previous time frame may be taken into consideration in determining the amount of delay for a current message. The delay may also be configured based on the user's prior interactions and analysis of those interactions performed by an ML and/or AI engine by executing an ML and/or an AI algorithm. The results obtained from the execution of the ML/AI algorithms may be used to determine a pattern of prior recalls and deletions and determine a likelihood that the current message will also be deleted or recalled. They may also be used to determine the amount of delay time based on previous data for delaying the transmission of the message. Additional factors for determining the amount of delay are provided in the description relating to FIGS. 12 and 14.

In some embodiments, as depicted in block 910, the server may provide an alert on the sending electronic device. Whether to display an alert may be determined based on the content of the message and whether such content may be appropriate based on the strength of the relationship between the sender and the recipient. Determining the relationship and its strength is further described in descriptions of blocks 202-203 of FIG. 2, blocks 302-303 of FIG. 3, and FIGS. 11-13. If a determination is made, based on the relationship and its strength, that the content of the message is not appropriate, then the server may display a pop-up alert on the sender's electronic device. The pop-up may include a warning or a message alerting the sender and, in some embodiments, may provide alternate language that is appropriate. In some embodiments, the purpose of the alert may be to warn or caution the sender that the content of the message is not appropriate to send to the recipient based on their relationship strength. The alert may provide options to the sender to delete the message, recompose the message with alternate language or images, accept alternate suggestions provided by the server, or override the alert and transmit to sender.

In some embodiments, as depicted in block 915, the server may both provide an alert and delay the transmission of the message. In some embodiments, an alert may be provided as described above in block 910. In response to the alert, a signal to transmit may still be received. This may be based on the sender ignoring the alert and selecting an option to transmit the message to the recipient. Since this message was a subject of the alert, the server may determine that there is a likelihood that the sender may want to recall or delete the message after it is sent. Such determination may be made based on prior message sending history of the sender. It may also be based on sender's prior interactions with the recipient and analysis of those interactions performed by an ML and/or AI engine by executing an ML and/or an AI algorithm. As such, the server may calculate the amount of delay, as described above in block 905, in addition to the alert provided.

In some embodiments, as depicted in block 915, the server may delay the initial message and not delay subsequent messages if an ongoing, real-time, or back-and-forth conversation is detected. Since delaying a back-and-forth or real-time conversation takes away from the messaging experience, once the server determines that the message is part of an ongoing conversation, then the server may not delay subsequent messages between the sender and the recipient, even if the first message was delayed. Details of this embodiment are further described in FIG. 10 below.

In some embodiments, as depicted in block 925, the server may override steps relating to providing an alert or delaying the transmission of a message if the message contains words or phrases that can be associated with a level of urgency or emergency. The server may also bypass steps relating to determination of the relationship or applying of analysis factors.

Figure 10:
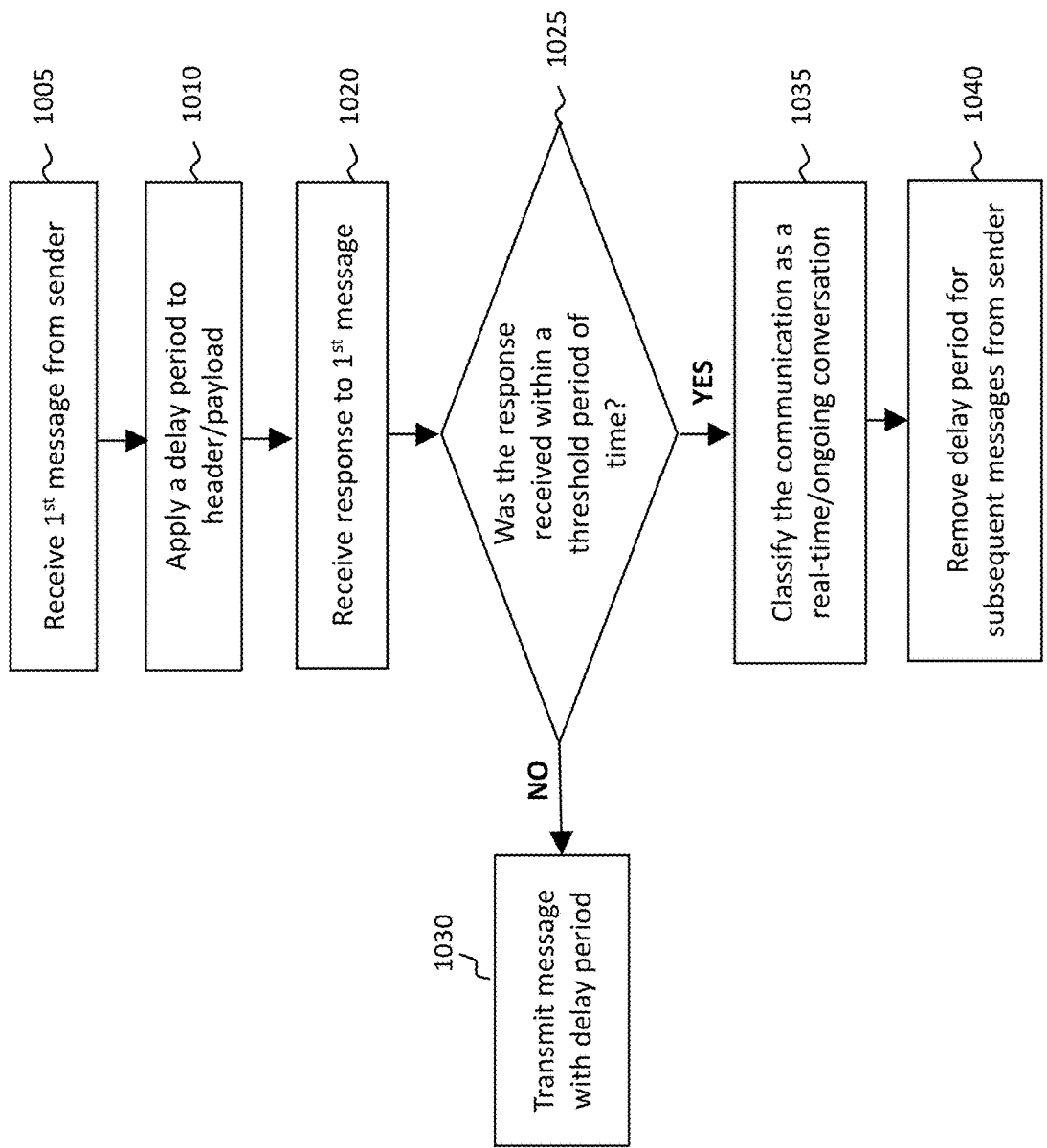
FIG. 10 is flowchart of a process for determining if a message is part of an ongoing conversation, in accordance with some embodiments of the disclosure.
Figure 11:
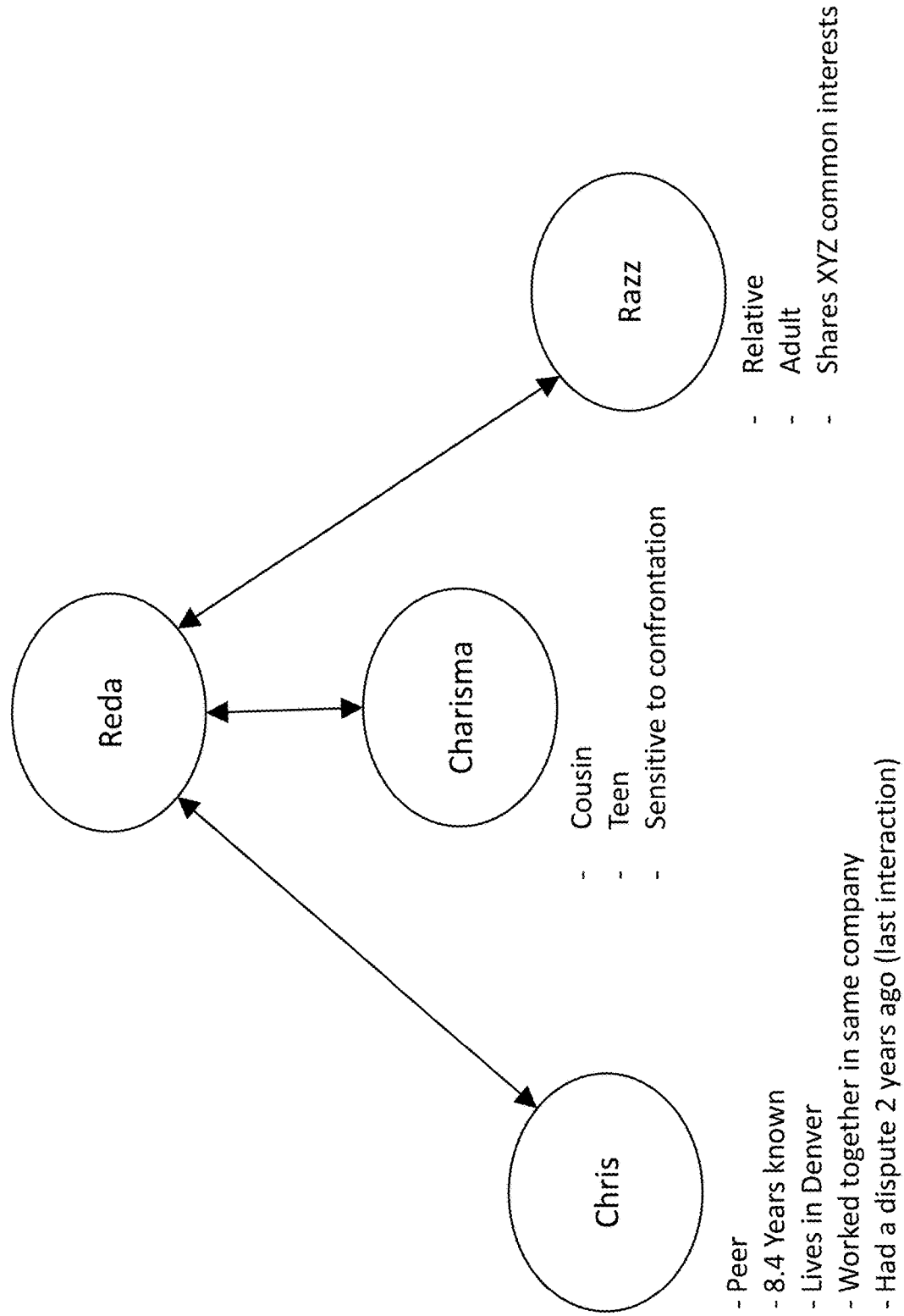
FIG. 11 is a knowledge graph of a relationship between a sender and a recipient of a message, in accordance with some embodiments of the disclosure.

FIG. 10 is flowchart of a process for determining if a message is part of an ongoing conversation, in accordance with some embodiments of the disclosure.

In some embodiments, at block 1005, a message is received from a sender electronic device. The message may have been composed by a sender associated with the sender electronic device in a messaging application that is either downloaded or factory-installed in the sender electronic device.

At block 1010, the server may determine that transmission of the message needs to be delayed. The reasons for the delay and the amount of the delay may be determined based on a plurality of factors, including the relationship between the sender and the recipient, or a history of previous delays and recalls. Additional details relating to the delay are provided in descriptions of FIGS. 12 and 14.

Since a determinization to delay the transmission of the message was made, the server may then imbed the amount of delay in a field of a header that is used to send the message. In other embodiments, the delay may be sent along with the payload of the message. The header or payload instructions would allow the server, the receiving electronic device, or a receiving server to delay the transmission of the message by the amount of delay time configured in the message.

At block 1020, the server may receive a response to the message sent with the delay in block 1010. At block 1025, the server may determine whether the response was received within that threshold period of time. An ongoing, real-time, back-and-forth conversation between two individuals typically contains messages exchanged between the two individuals within a few seconds or minutes of each other. The server may take what threshold amount of time is considered to be typical for an ongoing, real-time, back-and-forth conversation or may determine the threshold based on past conversations specifically between the sender and the current recipient to predetermine the threshold amount of time. The threshold period of time may be used to determine whether the response to the message can be associated with an ongoing, real-time, back-and-forth conversation between the sender and the recipient. In other words, if the response is received within the threshold amount of time, then it may be classified as an ongoing, real-time, back-and-forth conversation, as depicted at block 1035.

If the conversation has been classified as ongoing, real-time, back-and-forth conversation, then, at block 1040, the server may remove delay for subsequent messages sent from the sender electronic device to the same recipient.

If a determination is made at block 1025 that the response was not received within a threshold period of time, then, at block 1030, the server may transmit a subsequent message from the sender with a delay, if such a delay is warranted, i.e., based on the relationship and factor analysis described above.

FIG. 11 is a knowledge graph of a relationship between a sender and a recipient of a message, in accordance with some embodiments of the disclosure.

As depicted, a relationship knowledge graph between a sender of a message, Reda, and recipients, Chris, Charisma, and Razz may be created by the server. The server may determine the relationship between the sender and the recipients of the message based on a plurality of sources. In one embodiment, the server may determine the relationship based on information in the sender's profile or sender's contacts stored on their electronic device, such as their mobile phone contacts or their laptop or desktop email application. The sender may have saved the recipient's name along with a description of their relationship, such as friend or cousin, or may have listed the name of the recipient's workplace, which the server may determine is the same workplace as the sender. In another embodiment, the server may access one or more accounts associated with the sender, such as their social media accounts, work accounts, and email accounts and determine the relationship between the sender and the recipient based on analysis of the data from these accounts. The server may also access conversations between the sender and a digital assistant to determine a relationship between the sender and the recipient of the message. In yet another embodiment, the server may also access voice inputs from an electronic device, such as a mobile phone, to determine the relationship between sender and the recipient.

In addition to determining the relationship, the server may also determine details and other information relating to the recipient and store them in a database. Such information may include the recipient's age, workplace, preferences, interest, likes and dislikes, what the recipient may consider appropriate and inappropriate, the number of years the sender has known the recipient, and other information as depicted in blocks 203 and 303 of FIGS. 2 and 3.

The server may use the relationship and related information to generate the knowledge tree or graph as depicted in FIG. 11. For example, in one embodiment, the server may have determined that Reda and Chris have a peer relationship. The server may have also determined that Reda and Chris have known each other for 8.4 years and worked together in the same company previously. The server may have also determined that Chris lives in Denver and their last interaction resulted in a dispute two years. Accordingly, the server may generate a knowledge graph that describes the relationship between Reda and Chris and associated details about their relationship as obtained by the server by accessing previous conversations and other shared accounts between Reda and Chris.

In another example, the server may also establish a knowledge graph for Charisma. In this example, the server may have learned through previous interactions between Reda and Charisma that Charisma is Reda's cousin and that she is 18 and sensitive to confrontation. As such the server may generate the knowledge graph as depicted. Since Charisma is sensitive to confrontation, the server may analyze a message from Reda to Charisma providing consideration to words that may relate to a confrontation. If such words are detected, the server may provide an alert or delay the transmission of such a message using processes as described above in FIGS. 2, 3, 7 and 8.

In another example, the server may also establish a knowledge graph for Razz. In this example, the server may have learned through previous interactions between Reda and Razz that Razz is an adult and is Reda's relative. Such details may have also been obtained based on data gathered from Reda's profile, Reda's saved contacts for Razz, or accounts accessed by the server, such as social media accounts. Accordingly, the server may generate a knowledge graph that describes the relationship between Reda and Razz and associated details about their relationship.

Figure 12:
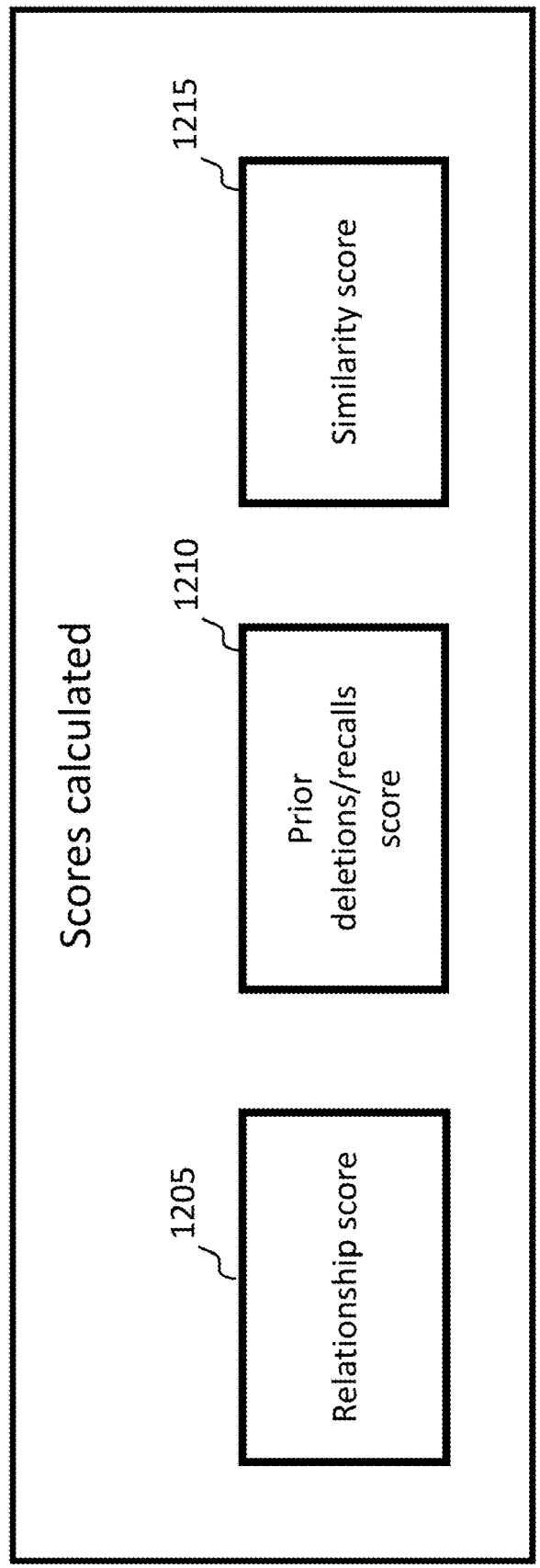
FIG. 12 is a block diagram of scores calculated, in accordance with some embodiments of the disclosure.

FIG. 12 is a block diagram of scores calculated, in accordance with some embodiments of the disclosure. In some embodiments, scores for relationship, prior deletions/recalls and recalls, and/or similarity of messages may be calculated. For example, a relationship score may be calculated, as depicted in block 1205, and used to determine the strength of the relationship between the sender of a message of a messaging application and its recipient. Some examples of relationship factors analyzed in determining a relationship score are described further in the description of FIG. 13.

In some embodiments, the relationship score is determined by analyzing every relationship factor of the relationship factors. In other embodiments, a selected one or more relationship factors may be analyzed to determine a relationship score. Either the relationship score for a relevant factor may be considered or averages, means, or other formulae of multiple factors may also be applied to compute an overall relationship. The relationship score may then be used to determine whether the content of the message is appropriate or inappropriate. For example, if the relationship score is high, which is associated with a close relationship between sender and recipient, then even a message that would have been inappropriate for some recipients may be appropriate to send, based on the strength of the relationship.

In some embodiments, as depicted at block 1210, prior deletions/recalls deletion score may also be calculated. Such score may be calculated based on a pattern of recalls or deletions by the sender to the specific recipient or generally to other recipients. For example, if the sender has a pattern of recalling or deleting a message 60% of the time a message is sent, then based on the pattern, the likelihood of the current message also being recalled or deleted may also be 60%. ML and AI algorithms may be executed by the server to determine such patterns, and the server may use those patterns to determine the likelihood of the current message being recalled or deleted. If a determination is made that a current message will likely be recalled or deleted, then the server may use the prior recall or deletion score to determine the amount of delay to embed into the message header or attach to the payload such that the transmission of the message is delayed by the delay amount. For example, if a determination is made that the likelihood of recall/deletion is 24%, then a lower recall/deletion score, such as a score of "24" may be determined. Likewise, if a determination is made that the likelihood of recall/deletion is 82%, then a higher recall/deletion score, such as a score of "82" may be determined. The 24 score may be used to delay the message by 5 seconds while the 82 score may be used to delay the message for 60 seconds due to a higher likelihood that it will be recalled or deleted by the sender.

In some embodiments, as depicted at block 1215, a similarity score is calculated. The similarity score may indicate that the message that is currently being sent is similar to a message that was previously sent. In order to determine similarity score, the server may analyze the content of a previous message, such as its words and phrases, and compare it to the current message. In another embodiment, when the message is an image, the server may analyze attributes of a previously sent image to attributes of the current image. In yet another embodiment, the content of the message may be compared to a list of words and phrases or images in a library of previously sent messages. The server may compare them to determine if the current message is similar to a previously sent message and, if so, to what percentage. As such the similarity score may determine to what degree or percent the current message is similar to the previously sent message. For example, an identical message sent previously would receive a 100% similarity score as all the attributes, words, or phrases are matched at 100%. In another example, a previously sent message which includes 70% of the content that is similar to the current message will receive a similarity score of 70%. Although certain scales have been used to describe the scores calculated at blocks 1205, 1210, and 1215, other scales, such as a 1-10 scale, a A-Z scale, a weak to strong scale, or like variations may also be used.

Figure 13:
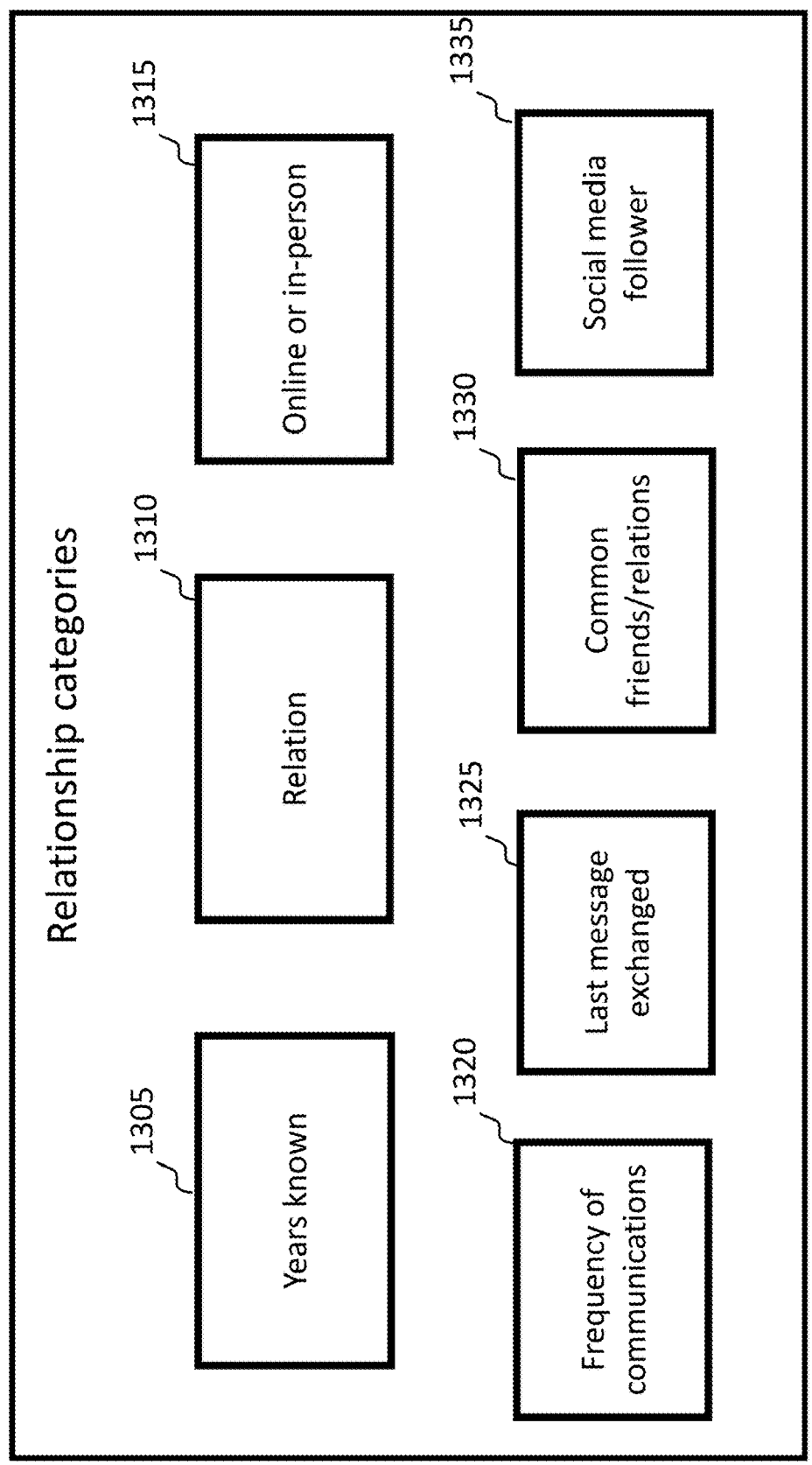
FIG. 13 is a block diagram of relationship categories analyzed to compute a relationship score, in accordance with some embodiments of the disclosure.

FIG. 13 is a block diagram of relationship categories analyzed to compute a relationship score, in accordance with some embodiments of the disclosure.

In one embodiment, as depicted as block 1305, one of the relationship categories that may be analyzed to determine a relationship score is "years known." This category relates to determining the number of years the sender of the message has known the recipient. The length of the number of years they have known each other is relevant to calculating the relationship score because a longer relationship is likely to be related to the sender and recipient being used to each other, being more comfortable with each other, having a better understanding of each other, all of which typically come with many years of knowing each other. As such, a longer the duration of relationship may be associated with a high relationship score.

In one embodiment, as depicted as block 1310, one of the relationship categories that may be analyzed to determine a relationship score is "relation." This category relates to determining the actual relation between the sender of the message and the recipient. For example, the recipient may be a close family member, a cousin, a co-worker, someone in the sender's social group, a social media friend, etc. This factor is relevant to calculating the relationship score because in a close relation two people are likely to have a better comfort level, understanding, and knowledge of each other and as such their relation may be used to determine a relationship score.

In one embodiment, as depicted as block 1315, one of the relationship categories that may be analyzed to determine a relationship score is "online vs. in-person." This category relates to determining whether the relationship is an online relationship or an in-person relationship. Determining whether it is an online vs. in-person relationship may be relevant to calculating the relationship score because, in some embodiments, if the relationship is more than a few online interactions, and is an in-person relationship where the sender and recipient have met, then it may be a stronger relationship, thereby associated with a higher relationship score.

In one embodiment, as depicted as block 1320, one of the relationship categories that may be analyzed to determine a relationship score is "frequency of communications." This category relates to determining whether the sender and recipient of the message frequently communicate with each other. Such is relevant to calculating the relationship score because individuals that communicate frequently are likely to have a better understanding, comfort level, and knowledge of each other as opposed to individuals that do not communicate as frequently. The server may determine what it considers to be a frequent communication and associate a relevant score. For example, a sender and recipient that communicate once in two months may have a lower relationship score than a sender and recipient that communicate once or twice a week. This factor and other factors mentioned above may be combined to determine an aggregated score. For example, if the sender has known two recipients, e.g., recipient 1 and recipient 2, for the same number of years, however the sender communicates with more frequently with recipient 1, then the relationship score for the relationship between sender and recipient 1 will be higher than that for recipient 2.

In one embodiment, as depicted as block 1325, one of the relationship categories that may be analyzed to determine a relationship score is "last message exchanged." This category may determine when the sender and the recipient have last communicated. Such data is relevant to calculating the relationship score because even though the sender and recipient may be related, or known each other for a number of years, if they last communicated many years ago or months ago, then it may be associated with their current relationship not being as frequent and likely not having the same comfort level, understanding, or knowledge of each other as they may have had years ago and as such may receive a lower relationship score. Of course, there may be exceptions to this when the relationship is a close family member, such as a mom, dad, or sibling, where even if the last communication was months ago, their relationship may still be categorized as a strong relationship. As such the factors mentioned in FIG. 13 may be weighed together for an aggregated relationship score.

In one embodiment, as depicted as block 1330, one of the relationship categories that may be analyzed to determine a relationship score is "common friends/relations." This category may determine whether sender and recipient have several common friends and relations together. If that is the case, the relationship score may reflect this.

In one embodiment, as depicted as block 1335, one of the relationship categories that may be analyzed to determine a relationship score is "social media follower." This category may determine whether the recipient is a social media follower, such as a Twitter™ follower etc., or whether the sender has a relationship with the recipient that is more than simply the recipient following them on Twitter™ or some other social media account. Such determination may distinguish strangers from people that the sender actually knows, and the data may be used to calculate the relationship score.

FIG. 14 is a block diagram of an example of factors used in analyzing providing an alert or delaying transmission of a message, in accordance with some embodiments of the disclosure.

Some of the factors for determining to provide an alert or delay the transmission of a message include relationship 1410, message deletion history 1420, deletion history specific to the current recipient 1430, time 1440, location 1450, and mood 1460.

As discussed above in FIG. 12 and other embodiments above, the relationship between a sender and recipient is considered in determining whether a current message should be delayed, or an alert should be provided. Other factors, as discussed above, such as message deletion history 1420 from sender to other recipients in general as well as to the specific recipient 1430, are also considered in determining whether a current message should be delayed, or an alert should be provided.

In some embodiments, time 1440 of the message is also considered in determining whether a current message should be delayed, or an alert should be provided. For example, if a message is sent during late hours in the night, then the server may determine that the sender may not be thinking properly at the late hour due to being tired and as such may have a higher likelihood of recalling or deleting the message. As such, such timing data may be used to determine whether to provide an alert and the duration of delay to be embedded for the message.

In some embodiments, location 1450 of the message is also considered in determining whether a current message should be delayed, or an alert should be provided. The server may determine the location of the sender electronic device based on a GPS locator that may be located within the device. For example, if a message is sent from a bar, nightclub, or a party place, the server may determine that the sender may not be thinking properly, or perhaps is intoxicated, and thus may have a higher likelihood of recalling or deleting the message. On the other hand, if the sender is at their office or a hospital during daytime, then it is likely that the sender has thought through the message before sending it and thus an alert and delay may not be needed.

In some embodiments, mood or emotion 1460 of the sender is also considered in determining whether a current message should be delayed, or an alert should be provided. For example, if the sender is in an angry or depressed mood after the occurrence of an event, such as an argument, death in family, or some other event occurring in their life, then the server may determine that there is a higher likelihood of the message composed by the sender while in such a mood to be cancelled or recalled. The server may determine the mood or emotion of the sender based on input from a plurality of sources. For example, these sources may be text messages, voice inputs, emails, calendar of events, or social media posts. For example, if the sender gets into an argument with someone else on a phone call, such input may be captured to determine the sender's current mood and emotion. If the sender posts angry comments on a social media post, such input may be captured to determine the sender's current mood or emotion. If the sender's calendar states that the sender has attended a funeral, such input may be captured to determine the sender's current mood or emotion.

FIG. 15 is an example of a table that is used to describe using a delay pattern in determining a delay for a current message, in accordance with some embodiments of the disclosure. In one embodiment, the table 1500 depicts various examples of senders and recipients, their relationship, frequency of communications, and years known, to determine a relationship rank.

In one embodiment, a sender "Adam" is sending a message to a friend. The server may have determined details relating to Adam and friend's relationship based on either Adam's profile or by accessing various accounts associated with Adam, such as social media accounts, emails, profiles, etc. In this example, the server has determined that Adam has known this friend for 10 years and they communicate daily, and as such has assigned the relationship a rank 1, which may be the highest rank on a 1-10 scale. Other order of ranking, such as a 10 being the highest, and other scales are also contemplated.

In one embodiment, a sender "Betsy" is sending a message to her mom. The server may have determined details relating to Betsy and her mom's relationship based on either Betsy's profile or by accessing various accounts associated with Betsy, such as her social media accounts, emails, profiles, etc. In this example, the server has determined that Betsy has known her mom her entire life and that they communicate daily, and, as such assigned the relationship a rank 2 on a 1-10 scale where 1 is the highest rank. Although Betsy and her mom is a closer relationship that Adam and his friend, in some embodiments, the server may determine that a mom-daughter relationship may not share everything as compared to a friend relationship and as such rank the Adam-friend relationship higher than Betsy-mom relationship. The server may, for example, make such a determination based on history of their past communications.

In one embodiment, a sender "Charlie" is sending a message to a player on her basketball team. The server may have determined details relating to Charlie and her basketball teammate based on either Charlie's basketball records or profile, or by accessing various accounts associated with Charlie, such as her social media accounts, emails, profiles, etc. In this example, the server has determined that Charlie has known her basketball teammate for 2 years and they communicate weekly, and, as such has assigned the relationship a rank 4 on a 1-10 scale where 1 is the highest rank. Since their interactions may be limited to basketball, the server may assign a score of 4 considering their past interactions do not rise to a higher level.

In one embodiment, a sender "Diya" is sending a message to her friend. The server may have determined details relating to Diya and her friend's relationship based on either Diya's profile or by accessing various accounts associated with Diya, such as her social media accounts, emails, profiles, etc. In this example, the server has determined that Diya has known her friend for 5 years and that they communicate once in 2 months, and, as such has assigned the relationship a rank 5 on a 1-10 scale where 1 is the highest rank. Although Diya has known her friend for a longer period than Adam has known his friend, i.e., 15 years vs. 10 years, the relationship of Adam and his friend is ranked higher than Diya and her friend's because Adam communicates daily with his friend while Diya only communicates once a year.

In one embodiment, a sender "Eraaj" is sending a message to a vice president at her company. The server may have determined details relating to Eraaj and her vice president based on either Eraaj's profile, Eraaj's LinkedIn™ profile or post, an employee database of the company to which access may be provided, or by accessing various accounts associated with Eraaj, such as her social media accounts, emails, profiles, etc. In this example, the server has determined that Eraaj has known her vice president for 4 years, they have worked together at a previous company, and they communicate twice a week, and, as such has assigned the relationship a rank 6 on a 1-10 scale where 1 is the highest rank. Since the relationship with a company vice president may be that of a work relationship where caution is to be exercised, the score may be assigned based on their respective positions as well as their past communications with each other.

In one embodiment, a sender "Frank" is sending a message to his son. The server may have determined details relating to Frank and his son either based on Frank's profile, or by accessing various accounts associated with Frank, such as his social media accounts, emails, profiles, etc. In this example, the server has determined that Frank communicates daily with his son. Although that is a very close relationship between a father and a son, since the son is only 8 years old, caution may need to be exercised on the type of words, content, and images that are sent to the son based on his age. As such as an age-appropriate score may be assigned.

In one embodiment, a sender "Gina" is sending a message to her boss. The server may have determined details relating to Gina and her boss either based on Gina's employee records or an employee database, or by accessing various accounts associated with Gina, such as her social media accounts, emails, profiles, etc. In this example, the server has determined that Gina communicates daily with her boss and accordingly has assigned a score of 8.

Since the relationship with her boss may be that of a work relationship where caution is to be exercised as her employment and her promotions depend on the boss, the score may be assigned based on their respective positions as well as their past communications with each other.

In one embodiment, a sender "Harry" is sending a message to social media friend. The server may have determined details relating to Harry and his friend's relationship based on Harry's social media accounts. In this example, the server has determined that Harry has never met his social media friend and only interacts with the friend once a year. As such, the relationship may be assigned a rank of 5 on a 1-10 scale where 1 is the highest rank. Since Harry does not have a close relationship with friend, the score reflects that the highest level of caution needs to be taken for messages between Harry and the social media friend.

FIG. 16 is an example of a table that is used to describe using a delay pattern in determining a delay for a current message, in accordance with some embodiments of the disclosure. In some embodiments, a delay pattern may be determined by using machine learning. As depicted in FIG. 16, Ron has deleted or recalled 8 messages and his average time period of the deletion/recall is 30 seconds. Jack had 3 previous deletions/recalls after his messages were sent to the recipient. Jack's average deletion/recall time is 45 seconds. Claire, on the other hand, had only 1 deletion and recall and that was done after 15 seconds. Such deletion/recall history data may be used by the server to determine the likelihood of a deletion/recall. Based on the total messages sent, i.e., Ron, Jack, and Claire all sent a total of messages, Ron has the highest percentage of deletions/recall requests. As such it is more likely that Ron will recall a message than Jack and Claire.

In some embodiments, the server may also analyze the average time it took for each individual to request a deletion/recall for the message. Such data may be used in determining a transmission delay to embed in a message that warrants such delay. For example, if a message that is composed by Ron is subject to a delay based on the processes described in FIGS. 3 and 7, then the delay configured to be embedded into the message may also be 30 seconds or more to allow Ron at least the same amount of time it took him previously to request a delete/recall of the message. Likewise, if a message that is composed by Jack is subject to a delay based on the processes described in FIGS. 3 and 7, then the delay configured to be embedded into the message may also be 45 seconds or more to allow Jack at least the same amount of time it took him previously to request a delete/recall of the message. According to the same analogy, the delay for Claire would be at least 15 seconds.

The server may also execute ML and AI algorithms to compare the current messages composed by the senders, or messages that are intended to be forwarded by the senders, to previously sent messages to determine if the messages are related. If they are related, then the server may determine the likelihood of deletion of the current message based on whether the sender requested a recall/deletion of the similar message previously.

FIG. 17 is an example of a same message sent by two different senders that results in two different transmission delay periods, in accordance with some embodiments of the disclosure. In some embodiments, although the message may be the same or similar, it may have a different outcome in terms of the delay configured for the message. For example, as depicted in FIG. 17, Zoe is sending a message to Klay and the content of the message is "That is not a workable idea. Come up with something different." Based on Zoe's messaging history to Klay, it looks like Zoe had 8 deletion requests when she messaged Klay. Marlon, on the other hand, is also transmitting the same message to Klay and only had 1 deletion request when sending a message to Klay. Based on the analysis of previous deletion, the server may determine that the likelihood of a request for deletion is higher when Zoe messages Klay than when Marlon messages Klay. Because the likelihood for Zoe to delete the message is higher, the server may configure a longer period of delay for Zoe than for Marlon, thereby allowing Zoe adequate time to recall the message before it is read by Klay. For sake of explanation of this example, an assumption is made that both Zoe and Marlon have same relationship score with Klay.

FIG. 18 is an example of using factors such as time, location, and mood in determining a delay for a current message, in accordance with some embodiments of the disclosure. In this example Green is messaging Steve, and the content of the message is "I am not going to do your work for you." This example explores the different outcomes in terms of delay times depending on the time and location of the message.

In one scenario, Green has requested the message to be sent to Steve at 2:35 PM. The server may also determine the GPS location of the sending device at the time the message was requested to be sent. Based on the GPS data, the server may determine that Green is currently at his office. Since the time of the day is during working hours, barring any other circumstances, the server may determine that Green is likely to have fully thought through the message when composing it. As such, the server transmits the message without any delay or transmits it with a minimum amount of delay, such as 15 seconds.

In another scenario, Green has requested the message to be sent to Steve at 10:17 AM. The server may also determine the GPS location at the time the message was requested to be sent. Based on the GPS data, the server may determine that Green is currently at his office. The server may also receive an input that Green's mood is currently angry. The server may determine such information by inputs such as voice, messages, and/or emails. For example, if Green was on a phone call with someone and he used a high-pitched voice or words of anger, the system may determine that Green is currently angry. If the message sent from Green is within a threshold period of time from the phone call, the system may determine that Green is still angry, and the message may not have been fully thought through by Green due to his angry mood. As such, the server may embed a delay of 30 seconds to the message, or some other delay number that is predetermined, and transmit the message with the delay.

In yet another scenario, Green has requested the message to be sent to Steve at 1:37 AM. The server may also determine the GPS location at the time the message was requested to be sent. Based on the GPS data, the server may determine that Green is currently at a bar at 1:37 AM. Based on the timing and location, the server may determine that Green may not have fully thought through the content of the message due to the late hour and the being at a bar. As such, the server may embed a delay of 60 seconds into the message, or some other delay length of time that is predetermined and transmit the message with the delay.

Figure 19B:
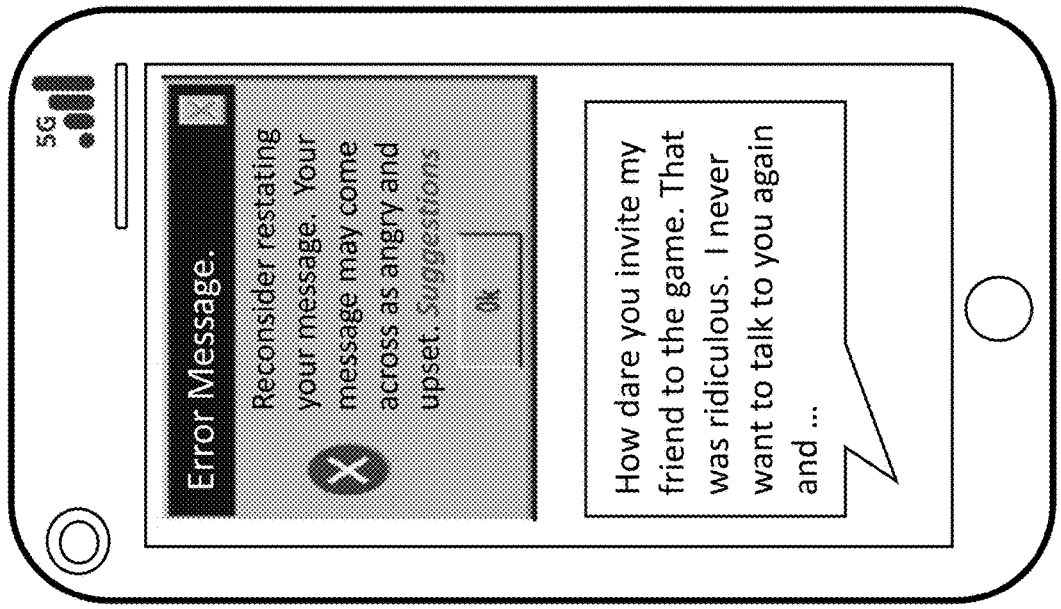
FIGS. 19A and 19B are examples of using an alert displayed on the sender's electronic device, in accordance with some embodiments of the disclosure.
Figure 19A:
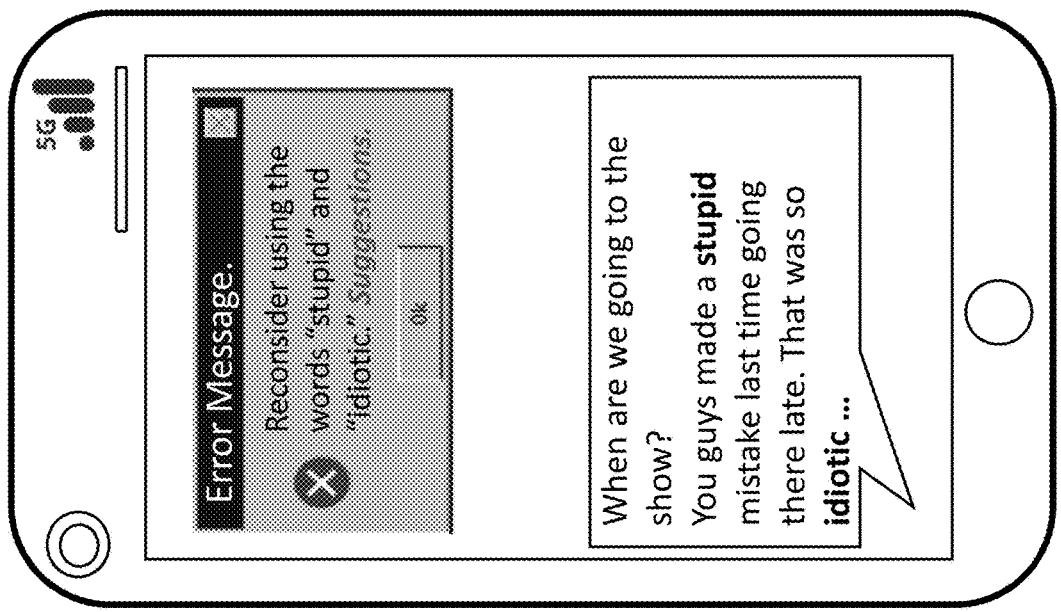

FIGS. 19A and 19B are examples of alerts displayed on the sender electronic device, in accordance with some embodiments of the disclosure. In one embodiment, as depicted in FIG. 19A, when a message includes content that exceeds the relationship score and analysis factors scores, which are based on the relationship score, then an alert may be displayed. Additional details of the alerts are described above in blocks 205-207 of FIG. 2, blocks 305-307 of FIG. 3, and FIG. 14. If the content is a text, then words and phrases from the content may be analyzed by executing an AI algorithm to determine whether the words are inappropriate based on the relationship score between the sender and the recipient. In this embodiment, the words "stupid" and "idiotic" have been highlighted by the server since they exceeded the threshold score of the analysis factors. Accordingly, an alert may be displayed as depicted in FIG. 19A. In one embodiment, the alert may identify the words that were the reason for the alert to be generated and provide a suggestion that a sender can select to use words that are appropriate based on the sender's relationship with the recipient. In another embodiment, as depicted in FIG. 19B, the alert may provide a basis for the generation of the alert but not necessarily point out specific words that are inappropriate.

Figure 20:
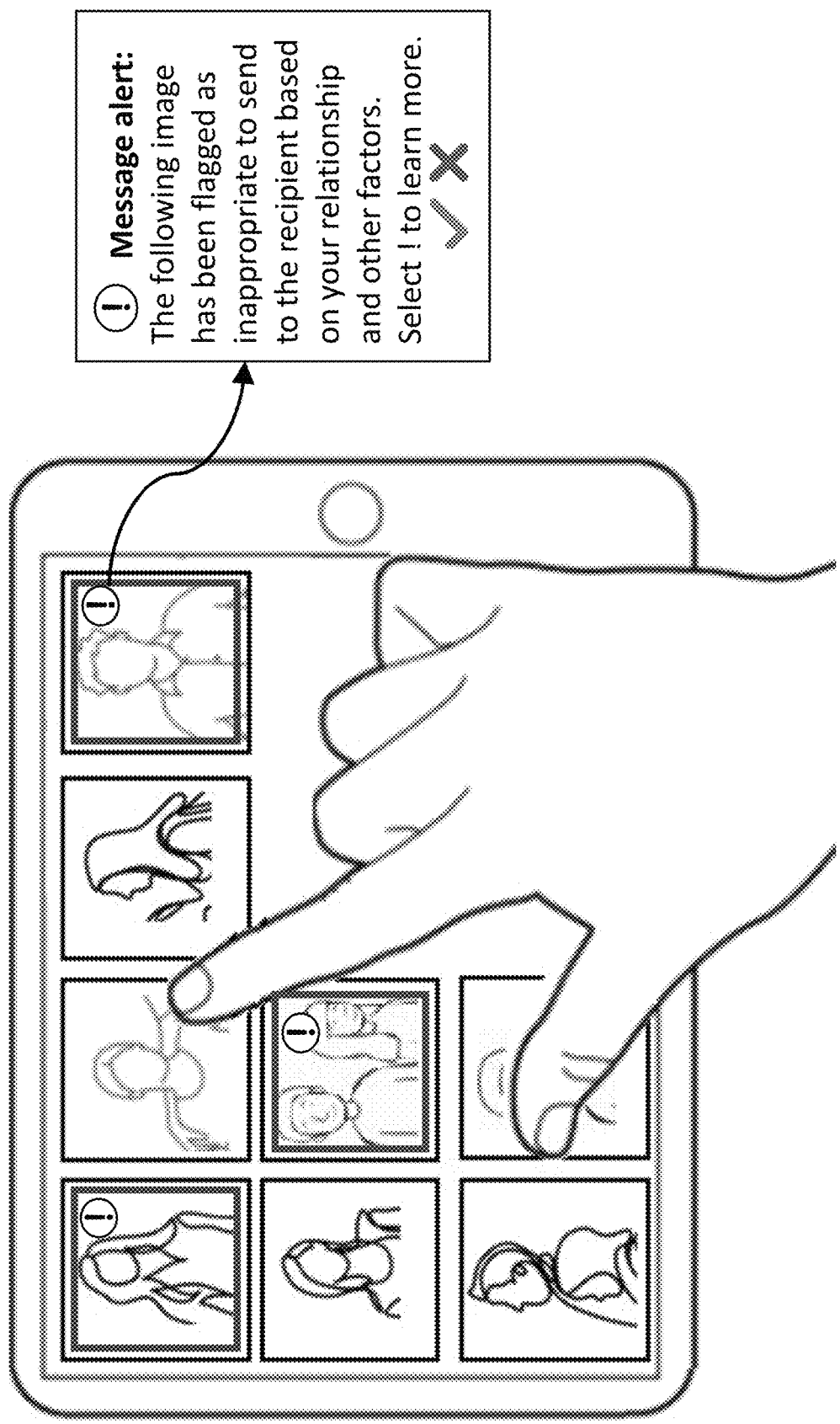
FIG. 20 is an example of a mobile phone, laptop, or online photo/image library and its highlighting based on content type, in accordance with some embodiments of the disclosure.

FIG. 20 is an example of a mobile phone, laptop, or online photo/image library and its highlighting based on content type, in accordance with some embodiments of the disclosure. In some embodiments, an image may be attached to a message that is to be transmitted to a recipient. In this embodiment, when a sender selects an image attachment option on their mobile phone, laptop, or other electronic device, the selection may allow the messaging application to access a photo library or storage that is part of the sender electronic device. The device may store photos taken by a camera of the sender electronic device or other photos that were downloaded or received by the sending device, such as through messaging applications, e.g., WhatsApp, etc. When the photo library is opened, the server may determine which photos are appropriate and which are not based on the relationship score and highlight the photos accordingly. For example, the server may highlight, draw a boundary, or mark the photos that are inappropriate with a symbol, such as an X, or gray them out so that such images cannot be selected for transmission. The server may also allow the sender to override the highlighting and graying-out feature such that the sender can ignore the recommendation and send the image to the recipient. If the sender choses to do so, the system may watermark the image. The server may also highlight or identify the message as inappropriate or may include a warning for the recipient.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, at a server, an indication of a message in a messaging application installed on a sender electronic device, wherein the message is addressed to a recipient electronic device;
   determining, by the server, a relationship score based on a strength of relationship between a user of the sender electronic device and a user of the recipient electronic device, wherein the relationship score is determined by the server based on a frequency of communications between the sender electronic device and the recipient electronic device;
   calculating, by the server, a factor score based on the determined relationship score and a message score associated with the message;
   determining, by the server, appropriateness of the message based on whether the message score associated with the message exceeds the calculated factor score;

determining, by the server, whether to display an alert on the sender electronic device, or automatically configure a transmission delay for transmission of the message, based on whether the message score exceeds the calculated factor score; and based on the determining whether to display an alert on the sender electronic device or automatically configure the transmission delay for transmission of the message, performing one of: (a) displaying the alert on the sender electronic device, or (b) configuring the transmission delay for transmission of the message.

2. The method of claim 1, further comprising determining that the message score exceeds the calculated factor score, and in response to the determination, displaying the alert on the sender electronic device.

3. The method of claim 2, further comprising, including suggestions in the alert to rephrase the message.

4. The method of claim 2, further comprising:
displaying an option to override the alert and transmit the message; and
configuring the transmission delay for the message if a selection is received to override the alert, wherein an amount of transmission delay for transmission of the message is calculated based on a likelihood of the message being recalled.

5. The method of claim 1, further comprising, determining that the message score does not exceed the calculated factor score, and in response to the determination, not displaying the alert on the sender electronic device.

6. The method of claim 1, wherein the relationship score is associated with a relationship factor and wherein the relationship factor is determined based on data input from sources selected from a group consisting of a) user profile of the user of the sender electronic device, b) messages exchanged between the sender and recipient electronic device, c) voice input received from the sender electronic device, d) social media accounts associated with the user of the sender electronic device and e) employee databases from an organization where the user of the sender electronic device is employed.

7. The method of claim 1, wherein the indication is received when the message is not yet transmitted from the sender electronic device to the recipient electronic device.

8. A method comprising:
receiving, at a server from a sender electronic device, a transmission request to transmit a message composed in a messaging application;
determining, by the server, a relationship score based on a strength of relationship between a user of the sender electronic device and a user of an intended receiving electronic device, wherein the relationship score is determined by the server based on a frequency of communications between the sender electronic device and the intended receiving electronic devices; and
using the relationship score, determining, by the server, whether the message is appropriate to transmit to the intended receiving electronic device by
determining a factor associated with a content of the message;
determining a factor score for the determined factor based on the relationship score and a message score; and
determining whether the message score exceeds the factor score;
determining, by the server, whether to delay the transmission of the message to the intended receiving electronic device, or automatically configure a transmission delay for transmission of the message, based on the determination of appropriateness of the content of the message; and based on the determining whether to delay the transmission of the message to the intended receiving electronic device, or automatically configure the transmission delay for transmission of the message, performing one of (a) delaying the transmission of the message to the intended receiving electronic device, or (b) configuring the transmission delay for transmission of the message.

9. The method of claim 8, further comprising:
determining that the message is not appropriate to transmit to the intended receiving electronic device; and
in response to the determination, determining to delay the transmission of the message to the intended receiving electronic device.

10. The method of claim 9, further comprising:
calculating a delay period for delaying the transmission of the message to the intended receiving electronic device; and
transmitting the message to the receiving electronic device after expiration of the calculated delay period.

11. The method of claim 10, wherein the delay period is calculated based on a likelihood of an amount of time it may take for the user of the sender electronic device to recall the message.

12. The method of claim 8, further comprising, determining a delay period for delaying the transmission of the message to the intended receiving electronic device, wherein the delay period is determined based on one or more time periods between sending and recalling of one or more previous messages to the receiving electronic device.

13. The method of claim 1, further comprising:
determining that the message is not appropriate to transmit to the receiving electronic device if the message score exceeds the factor score; and
determining that the message is appropriate to transmit to the receiving electronic device if the message score does not exceed the factor score.

14. The method of claim 8, wherein determining the relationship score further comprises:
determining a type of relationship between the user of the sender electronic device and the user of the receiving electronic device;
calculating scores of one or more relationship factors associated with the type of relationship; and
determining an overall relationship score.

15. The method of claim 14, wherein the relationship factors are selected from a group consisting of type of relation, years known, last communicated, and online vs in-person communication.

16. A system comprising:
communications circuitry configured to access a sender electronic device; and
control circuitry configured to:
receive an indication of a message in a messaging application installed on a sender electronic device, wherein the message is addressed to a recipient electronic device;
determine a relationship score based on a strength of relationship between a user of the sender electronic device and a user of the recipient electronic device, wherein the relationship score is determined by the server based on a frequency of communications between the sender electronic device and the recipient electronic device;

calculate a factor score based on the determined relationship score and a message score associated with the message;

determine appropriateness of the message based on whether the message score associated with the message exceeds the calculated factor score;

determine whether to display an alert on the sender electronic device, or automatically configure a transmission delay for transmission of the message by the communications circuitry, based on whether the message score exceeds the calculated factor score; and based on the determination of whether to display the alert on the sender electronic device, or automatically configure the transmission delay for transmission of the message by the communications circuitry, perform one of (a) display the alert on the sender electronic device, or (b) configure the transmission delay for transmission of the message by the communications circuitry.

17. The system of claim 16, further comprising, the control circuitry configured to determine that the message score exceeds the calculated factor score, and in response to the determination, the control circuitry configured to display the alert on the sender electronic device.

18. The system of claim 16, further comprising, the control circuitry configured to display an option to override the alert and transmit the message.

19. The system of claim 18, further comprising, the control circuitry configured to delay the message if a selection is received to override the alert.

20. The system of claim 16, wherein the relationship score is associated with a relationship factor and wherein the relationship factor is determined by the control circuitry based on data input from sources selected from a group consisting of a) user profile of the user of the sender electronic device, b) messages exchanged between the sender and recipient electronic device, c) voice input received from the sender electronic device, d) social media accounts associated with the user of the sender electronic device and e) employee databases from an organization where the user of the sender electronic device is employed.

21. The method of claim 1, further comprising:
determining that the message is not appropriate; and
in response to the determination that the message is not appropriate, displaying the alert on the sender electronic device.

\* \* \* \* \*